(12) United States Patent
Sieler et al.

(10) Patent No.: US 9,826,204 B2
(45) Date of Patent: Nov. 21, 2017

(54) MULTI-APERTURE PROJECTION DISPLAY AND SINGLE IMAGE GENERATOR FOR THE SAME

(71) Applicant: Fraunhofer-Gesellschaft zur Foerderung der angewandten Forschung e.V., Munich (DE)

(72) Inventors: Marcel Sieler, Jena (DE); Peter Schreiber, Jena (DE); Alf Riedel, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/937,798

(22) Filed: Nov. 10, 2015

(65) Prior Publication Data
US 2016/0065921 A1    Mar. 3, 2016

Related U.S. Application Data

(63) Continuation of application No. PCT/EP2014/059581, filed on May 9, 2014.

(30) Foreign Application Priority Data

May 10, 2013   (DE) ................ 10 2013 208 625

(51) Int. Cl.
*H04N 9/31* (2006.01)
*G03B 21/00* (2006.01)
*G02B 27/01* (2006.01)

(52) U.S. Cl.
CPC ....... *H04N 9/3147* (2013.01); *G02B 27/0101* (2013.01); *G02B 27/0172* (2013.01); *G03B 21/001* (2013.01); *G02B 2027/0127* (2013.01)

(58) Field of Classification Search
CPC ................. H04N 9/3147; G03B 21/001
See application file for complete search history.

(56) References Cited

U.S. PATENT DOCUMENTS

| 5,621,500 A | * | 4/1997 | Shiraishi ............ G03F 7/70575 355/53 |
| 8,777,424 B2 | | 7/2014 | Schreiber et al. |

(Continued)

FOREIGN PATENT DOCUMENTS

| CN | 1365459 A | 8/2002 |
| DE | 102009024894 A1 | 12/2010 |

(Continued)

OTHER PUBLICATIONS

Sieler, Marcel et al., "Ultraslim fixed pattern projectors with inherent homogenization of illumination", Applied Optics, vol. 51 No. 1, 2012, pp. 64-74.

(Continued)

*Primary Examiner* — Brian Yenke
*Assistant Examiner* — Sean Haiem
(74) *Attorney, Agent, or Firm* — Michael A. Glenn; Perkins Coie LLP

(57) ABSTRACT

Generating images to be projected at different projection distances with a multi-aperture projection display, statically or without any conversion, neither mechanically nor at the imager, is enabled by designing the single images of the multi-aperture projection display in a suitable manner, namely by combining provisional single images for the projection channels of the multi-aperture projection display, which are intended for each of the at least two images to be projected, projection channel by projection channel, to the actual or final single images.

19 Claims, 16 Drawing Sheets

(56) References Cited

U.S. PATENT DOCUMENTS

| | | | | |
|---|---|---|---|---|
| 2002/0159035 A1* | 10/2002 | Koyama | ............ | H04N 5/44513 |
| | | | | 353/31 |
| 2003/0160949 A1* | 8/2003 | Komatsuda | ......... | G03F 7/70075 |
| | | | | 355/71 |
| 2005/0007561 A1* | 1/2005 | Koyama | ............ | H04N 5/44513 |
| | | | | 353/94 |
| 2010/0110385 A1* | 5/2010 | Choi | ..................... | G06F 1/1626 |
| | | | | 353/20 |
| 2011/0228231 A1* | 9/2011 | Schreiber | ............. | G02B 3/0056 |
| | | | | 353/31 |
| 2011/0304825 A1* | 12/2011 | Sieler | ................. | G02B 27/0101 |
| | | | | 353/20 |
| 2012/0256824 A1* | 10/2012 | Mizunuma | ............ | G06F 3/0425 |
| | | | | 345/156 |
| 2014/0146290 A1 | 5/2014 | Sieler et al. | | |

FOREIGN PATENT DOCUMENTS

| | | | |
|---|---|---|---|
| DE | 102011076083 A1 | 11/2012 | |
| EP | 1484929 A2 | 12/2004 | |

OTHER PUBLICATIONS

Smith, W.J., "Modern Optical Engineering", McGraw-Hill, 2007, pp. 144-149.

* cited by examiner

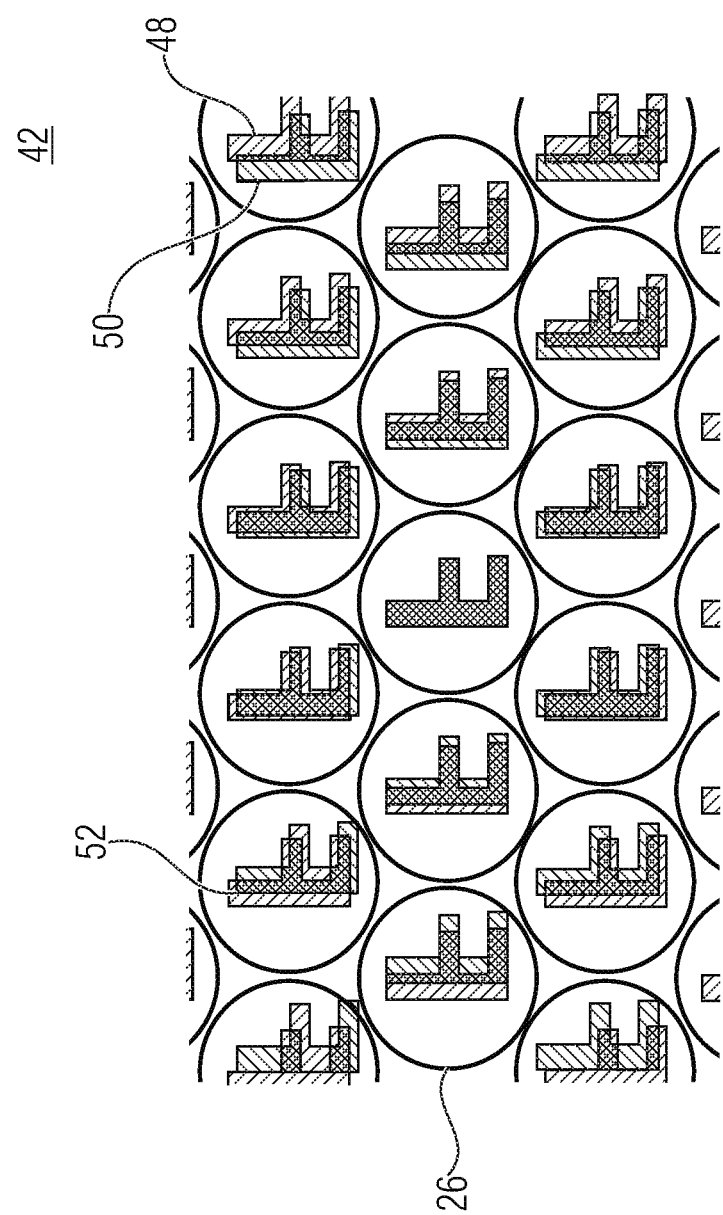

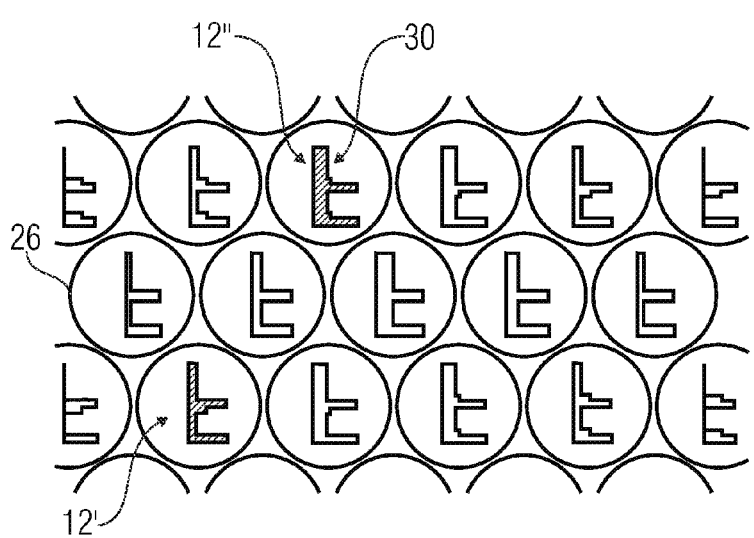
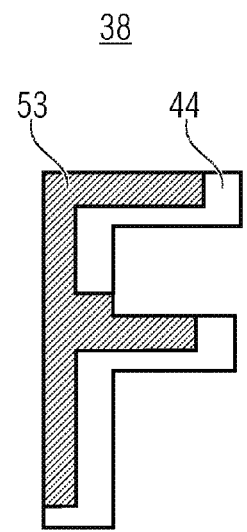
FIG 4A  FIG 4B
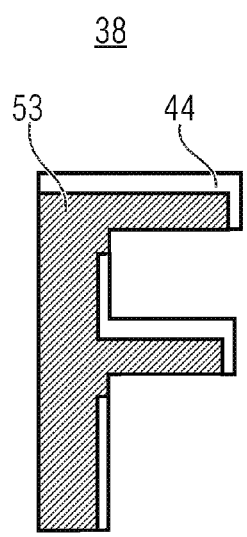
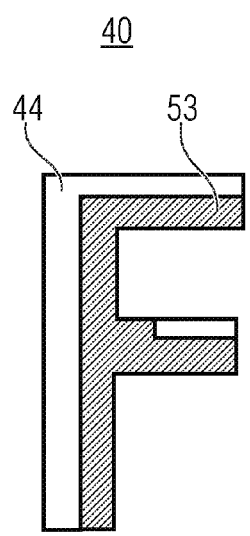
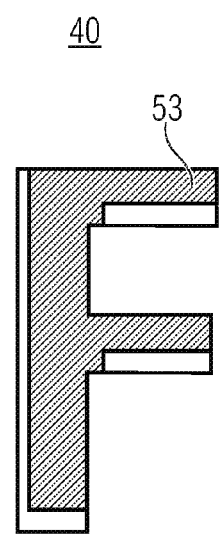
FIG 4C  FIG 4D  FIG 4E

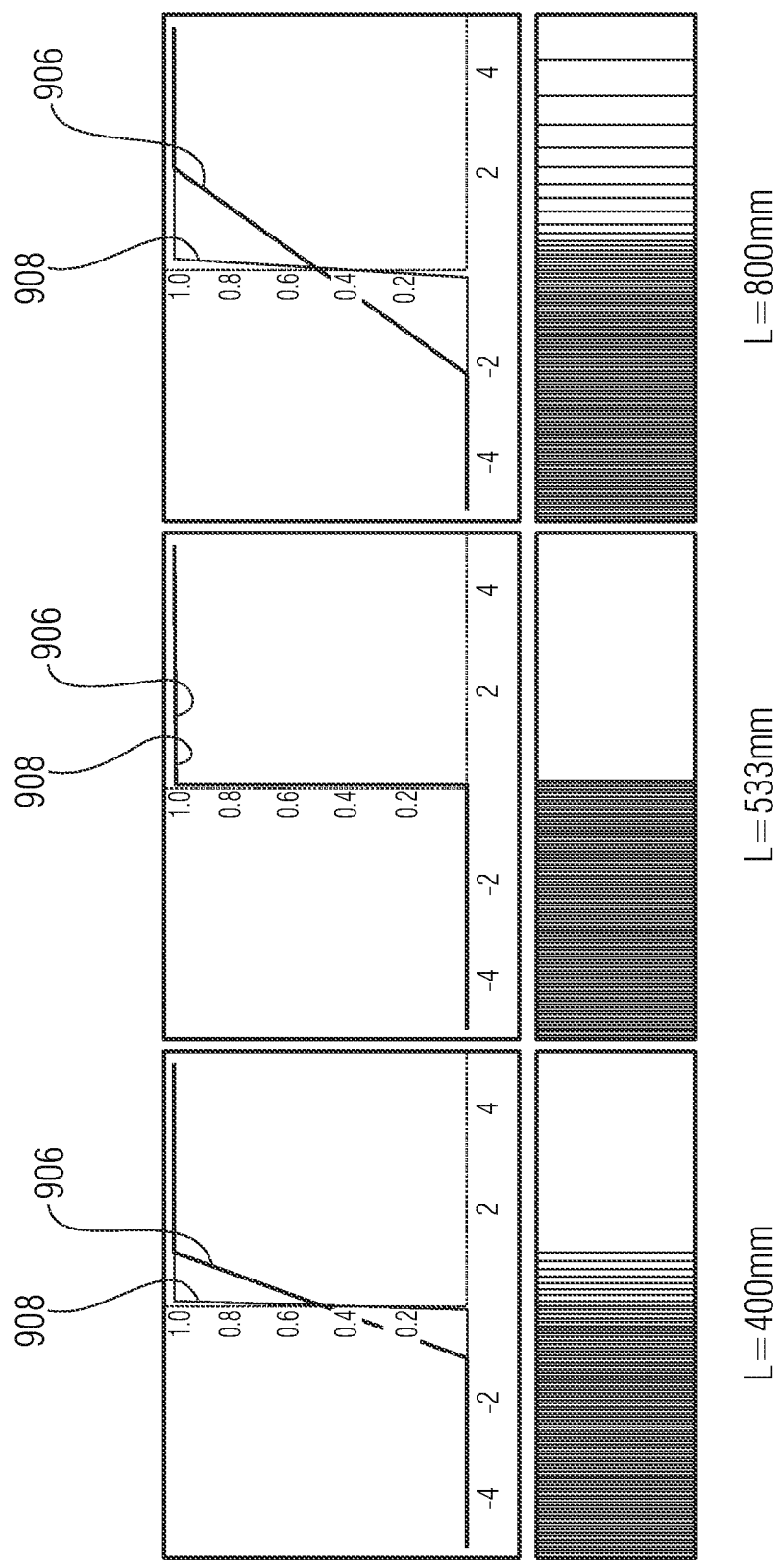

MULTI-APERTURE PROJECTION DISPLAY AND SINGLE IMAGE GENERATOR FOR THE SAME

CROSS-REFERENCE TO RELATED APPLICATIONS

This application is a continuation of copending International Application No. PCT/EP2014/059581, filed May 9, 2014, which claims priority from German Application No. 10 2013 208 625.3, filed May 10, 2013, which are each incorporated herein in its entirety by this reference thereto.

BACKGROUND OF THE INVENTION

The present invention relates to multi-aperture projection displays and single image generation for the same.

So far, no satisfying technical solution exists for mapping different patterns onto different geometries or projection distances. Some solutions enable these mapping characteristics by changing the object structures, such as in the form of a digital imager, or by mechanical manipulation of the mapping optics according to the mapping equation, such as by changing the focal length or back focal length. However, such solutions are expensive.

A specific case of the just described mapping characteristics is maintaining a fixed light pattern across a defined distance range. This characteristic is equivalent to the depth of focus in optics.

The screen-side depth of focus (DoF) of a projector results, according to geometric considerations, from projection distance L, pupil expansion D and the acceptable blur angle β according to FIG. 13 by the following relation (W. J. Smith, Modern Optical Engineering (McGraw-Hill, 2007)).

$$L_{N,F} = \frac{D \cdot L}{D \pm 2L \cdot \tan\left(\frac{\beta}{2}\right)} \approx \frac{D \cdot L}{D \pm L \cdot \beta} \quad (1)$$

$$Dof = L_F - L_N \approx \frac{2DL^2\beta}{D^2 - L^2\beta^2} \quad (2)$$

Thus, increasing the depth of focus for a given distance L and an accepted blur angle β according to (1) and (2) is only possible by reducing the pupil size D. This is accompanied by brightness loss of the projection, since the transmitted light flux is proportional to the accepted solid angle of each object point in the plane and is thus also reduced when reducing the pupil area $D^2$ (W. J. Smith, Modern Optical Engineering (McGraw-Hill, 2007)).

An alternative approach for obtaining a great projector depth of focus is the usage of laser-illuminated MEMS mirrors using a scanning image buildup. Due to the small mirror area, the same do inherently have a great depth of focus, however, for a good image impression, the same necessitate both coherent light sources and fast, movable mechanical members (MEMS mirrors), which limits their robustness and potential fields of application. Further, the projection image generated in this manner can be adversely influenced by coherent effects, such as speckle, as long as no further technical measures for minimizing the same are taken.

FIG. 14 shows a multi-aperture arrangement of microprojectors, i.e., an array projector described, for example, in DE 102009024894 A1. The multi-aperture approach used therein allows decoupling the system installation length of the projection system from the obtainable light flux, allowing compact and, at the same time, bright projection systems. Previous publications concerning this optics approach describe a regular two-dimensional arrangement of microprojectors, each consisting of a field lens 902, an object structure/slide 903 and projection optics 904. The overall arrangement is backlit by an extended or planar light source 901. The projected overall image results from the focused superposition of all single images at a precise projection distance L. This is performed by a well-defined arrangement of the individual slides 903 with regard to the corresponding project lenses 904 according to equation (3).

$$L = s \cdot \frac{p}{\Delta p}, \quad s = \frac{FL}{L - F} \quad (3)$$

Here, p means the center aperture distance between the individual projection lenses 904 and p+Δp means the center distance between the object structures or single images 903. For the common sizes, reference is made to FIG. 15, which shows that s is the image distance, i.e., the distance between single image 903 and respective projection optics 904 and F is the focal length of the projection optics 904.

Due to the small apertures of each individual projection lens 904, the depth of focus of the individual projectors is very large (cf. equation (2)). Here, the hyperfocal distance of the individual projections is typically significantly below the distance L.

The set distance where the overall image results by superposition of all single images is essentially determined by the focal length/back focal length of the individual projectors 904 and the center distance difference Δp of the object structures 903 with respect to the corresponding projection lens array of lenses 904 (cf. Marcel Sieler, Peter Schreiber, Peter Dannberg, Andreas Bräuer, and Andreas Tünnermann, "Ultraslim fixed pattern projectors with inherent homogenization of illumination," Appl. Opt. 51, 64-74 (2012)).

Thus, in equation 3, F corresponds to the focal length and p to the distance or center distance of the projector lenses 904 to one another and Δp to the center distance difference between the slides 902 and the lenses 904, wherein s describes the back focal length resulting according to the paraxial mapping equation by combining L and F. From equation 3, it results that the depth of focus of the overall image 905 projected by superposing the individual microprojectors, by neglecting geometric aberrations, corresponds to the one of a classical single channel project having a pupil size corresponding to the lateral expansion D of the microprojector array (cf. Marcel Sieler, Peter Schreiber, Peter Dannberg, Andreas Bräuer, and Andreas Tünnermann, "Ultraslim fixed pattern projectors with inherent homogenization of illumination," Appl. Opt. 51, 64-74 (2012)).

FIG. 16 shows, for example, the blur behavior of a conventional single channel projector as shown exemplarily in FIG. 13, namely at reference number 906, and a single projector lens and an array projector according to FIG. 14 and FIG. 15 at 908. All systems are focused onto a set distance of 533 mm. The blur behavior of an individual projection channel and an array projector correspond to one another insofar that they are commonly represented by the curve 908. This means that the blur behavior of a single channel projector and a conventional array projector of the same pupil size correspond to one another by neglecting further aberrations and vignetting effects by dead zones.

It would be desirable to have a system enabling the display of different images on different projection distances or geometries in a more objective manner.

SUMMARY

According to an embodiment, a single image generator for a multi-aperture projection display with a plurality of projection channels may have: an input that is implemented to receive image data representing at least two images to be projected at different projection distances; a single image calculator that is implemented to calculate a provisional single image for each of the at least two images to be projected per projection channel of the multi-aperture projection display; and a combiner that is implemented to combine, for each projection channel, the provisional single images of the respective projection channel calculated for the at least two images to be projected to a final single image for the respective projection channel.

Another embodiment may have a multi-aperture projection display including an inventive single image generator.

Another embodiment may have a multi-aperture projection display including a plurality of laterally adjacent projection channels including one single image generator each for generating a respective single image and optics for mapping the respective single image which lies in an object plane of the optics into a projection direction of the multi-aperture projection display, wherein the single images of the projection channels are implemented such that the mappings of the single images of the projection channels are superposed at at least two different projection distances to one respective projected image each, wherein the single images are darkened more with respect to a positive superposition at locations where the non-zero-valued portions of the projected images reside when back-projected via the optics of the projection channels into the object plane of the optics of the projection channels reside at least partly, but no superposition of all of them, than at locations where the non-zero-valued portions of the projected images are all superposed with one another when back-projected via the optics of the projection channels into the object plane of the optics of the projection channels.

According to another embodiment, a method for single image generation for a multi-aperture projection display including a plurality of projection channels may have the steps of: receiving image data representing at least two images to be projected at different projection distances; calculating a provisional single image for each of the at least two images to be projected per projection channel; and combining, for each projection channel, the provisional single images of the respective projection channel calculated for the at least two images to be projected, to a final single image for the respective projection channel.

Another embodiment may have a production method with an inventive method for single image generation and a production of an array of optical masks such that the same correspond to the final single images generated according to FIG. 16.

Another embodiment may have a computer program having a program code for performing the inventive method when the program runs on a computer.

The core idea of the present invention is the finding that it is possible to generate images to be projected with a multi-aperture projection display at different projection distances, statically or without any adjustment, neither mechanical nor at the imager, when the single images of the multi-aperture projection display are designed in the suitable manner, namely by combining provisional single images for the projection channels of the multi-aperture projection displays, intended for each of the at least two images to be projected, projection channel by projection channel into the actual or final single images.

According to embodiments, this is performed such that, for each projection channel, the final single image is—at locations where portions of the provisional single images of the respective projection channel intended for the images to be projected, which are valued unequal to zero, such as transmissive or luminous locations, reside at least partly, i.e. where the non-zero-valued portion of at least one image to be projected, but not all of them are superposed—darkened more with respect to a positive superposition of the provisional single images of the respective projection channel than at locations where the non-zero-valued portions of the provisional single images of the respective projection channel calculated for the images to be projected all are superposed. For the combination, for example, a logic operation is used between the provisional single images intended for the images to be projected, such as a logical AND- or OR-operation.

Thus, according to an embodiment, for single image generation for a multi-aperture projection display having a plurality of projection channels, image data are used that represent at least two images to be projected at different projection distances, and for each of the at least two images to be projected, a provisional single image is calculated per projection channel of the multi-aperture projection display, wherein a combiner is implemented to combine, for each projection channel, the provisional single images of the respective projection channel calculated for the at least two images to be projected to a final single image for the respective projection channel.

However, embodiments also provide a multi-aperture projection display, wherein the single images of the projection channels are implemented such that the mappings of the single images of the projection channels are superposed to one projected image each at at least two different projection distances, wherein the single images are darkened more with respect to a positive superposition at locations where the non-zero-valued portions of the projected images reside when back-projected via the optics of the projection channels into the object plane of the optics of the projection channels at least partly, but no superposition of all of them, than at locations where the non-zero-valued portions of the projected images all are superposed with one another when back-projected via the optics of the projection channel into the object plane of the optics of the projection channels.

BRIEF DESCRIPTION OF THE DRAWINGS

Embodiments of the present invention will be detailed subsequently referring to the appended drawings, in which:

FIG. 3 shows schematically a back projection of two images to be projected into the object plane of the optics of the channels and an AND-operation of the transmissive areas of the mask data or provisional single images, wherein object structures lying at the outside in the images to be projected are allocated to a shorter projection distance;

FIG. 4a shows a top view of the object structure resulting from the AND-operation of FIG. 3 illustrating the final single images;

FIG. 4b shows the projected portion of channel 12' of FIG. 4a at the projected image as resulting at the shorter project distance with the final single images, according to FIG. 4a;

FIG. 4c shows the projected portion of channel 12" of FIG. 4a at the projected image as resulting at the shorter project distance with the final single images, according to FIG. 4a;

FIG. 4d shows the projected portion of channel 12' of FIG. 4a at the projected image as resulting at the longer project distance with the final single images, according to FIG. 4a;

FIG. 4e shows the projected portion of channel 12" of FIG. 4a at the projected image as resulting at the longer project distance with the final single images, according to FIG. 4a;

FIG. 16 shows the blur behavior of a conventional single channel projector, a single projection channel and an array projector without depth of focus extension.

DETAILED DESCRIPTION OF THE INVENTION

Before specific embodiments of the present application will be described below, first of all an attempt is made to describe the basic idea underlying the embodiments described below. The embodiments described below are, for example, suitable for enabling mapping of several light patterns onto different geometries or set distances. A specific case thereof is maintaining a unique light pattern according to mapping scale across an enlarged distance range. This can be referred to as extending the depth of focus. For illustrating the principles underlying the embodiments described below, this specific case will be discussed first.

Mapping characteristics of an array projector or a multi-aperture projection display are the basis. Due to the two-dimensional arrangement of micro projectors or projection optics typically having an aperture $D_{single}$<1 mm, a comparatively large depth of focus results for the individual projector, i.e. an individual projection channel, compared to a single channel projector having an overall aperture equivalent to the array. For typical projection distances of more than 300 mm, hyperfocal mapping of each projection channel exists, i.e., no real far distance $L_F$ of the depth of focus range exists.

Figure 15:
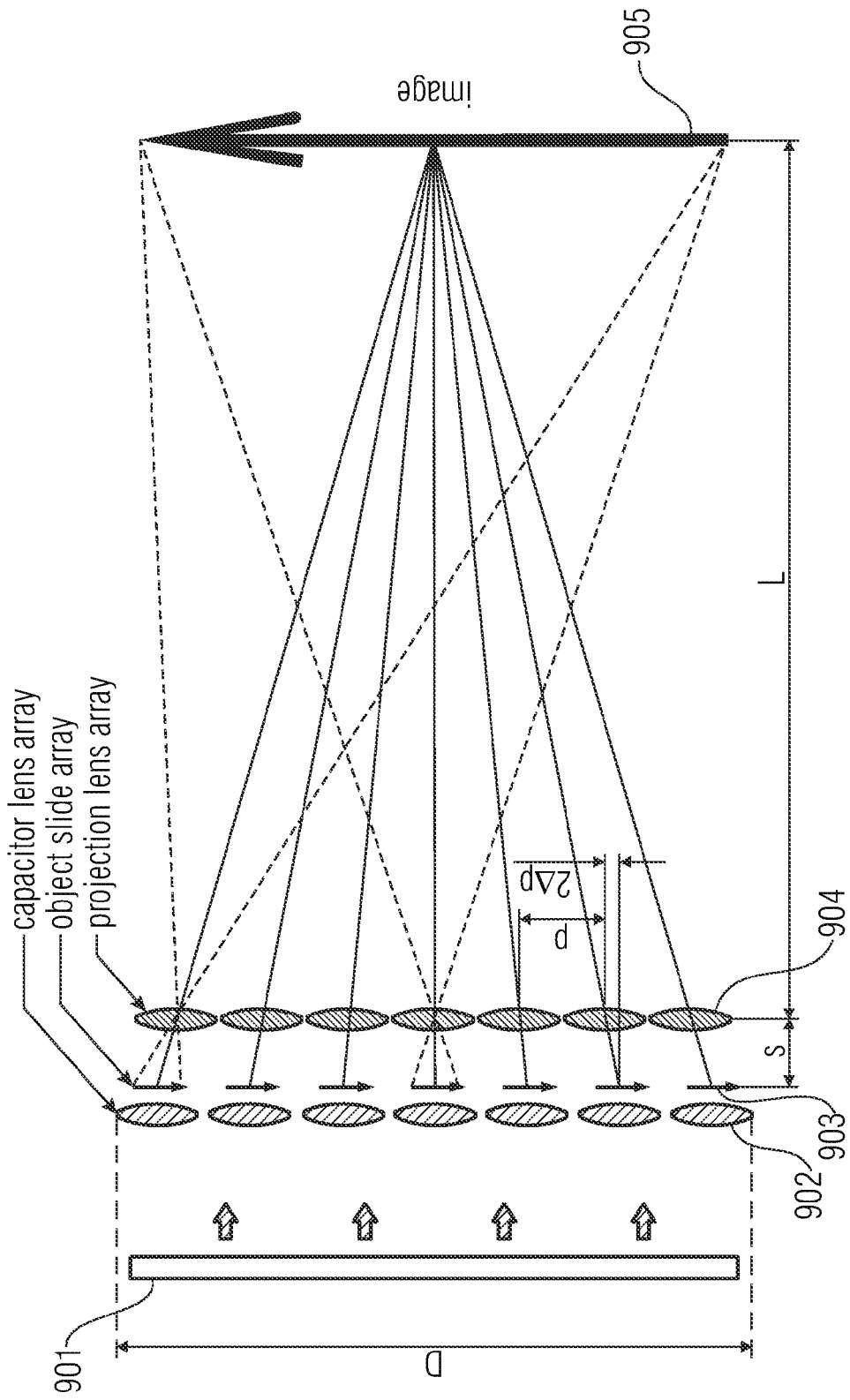
FIG. 15 shows a schematic cross-section of the arrangement of FIG. 14 for illustrating a 2D layout for determining the distance at which a focused image results by superposing the projection channels.

Starting point of the subsequent embodiments is the generation of specific object structures or single images within the object plane of the projection optics whose image-side superposition resulting from the optical mappings of all projection optics constructively contribute to the overall image in the desired depth of focus range. A multi-channel projection display according to FIG. 4B is considered as specific example. The projection display is exemplarily set to a screen distance of 400 mm. Set in that way, each projection channel has a depth of focus range extending from, for example, 200 mm to infinity. As described above, the whole array has, analogous to a single aperture projector having entrance pupils size D (cf. FIG. 15), an expansion of the whole optics array, merely a depth of focus extending from 350 . . . 450 mm. It is the object to make better use of the depth of focus of the individual channels and still maintain the brightness of a multichannel projection display. The following embodiments use the following approach: when an image to be projected is viewed within the intended depth of focus range and tracing back for each projection distance within the depth of focus range to which object structure the same corresponds in the object plane of the projection channel, it can be seen that there are areas in the object planes of the projection channels that contribute to the image to be projected at any distance within the intended depth of focus range. The following embodiments utilize this fact by manipulating each channel-specific contribution to the overall image such that the image information for the image to be projected is maintained for all desired distances within the depth of focus range. For this, as will be explained below, locations in the object planes of the projection channels where the object structures of the back projection of the image to be projected exist only partly at the varying distances within the depth of focus range, i.e., not all of them overlap, are darkened or even removed, i.e. for example the shadow mask is shaded there, such that, as the following statements will show, the depth of focus range can actually be significantly increased. However, this tough procedure corresponding to an AND-operation could also be modified.

As the following embodiments will show, the images to be projected at the different distances are not limited to images to be projected that are self-similar or that can be converted into one another according to the optical projection. Rather, any image content can be obtained at the different projection distances. First, based on FIGS. 1 to 2, the train of thought or the construction instruction for the single image content of the individual object structures, that are channel dependent, will be described based on the specific case of the extended depth of focus.

First, the description is made based on the projection of a bright object, here a letter "F" onto two perpendicular screen planes. An extension to any number of (intermediate) distances is obvious and will also be described mathematically below.

Thus, the image content of the individual object structures or single images is channel-dependent. The construction instruction of the same will be described in more detail, first, based on the specific case of the extended depth of focus, but then, the description and the indication that different image contents can be generated at different projection distances will follow.

Figure 1:
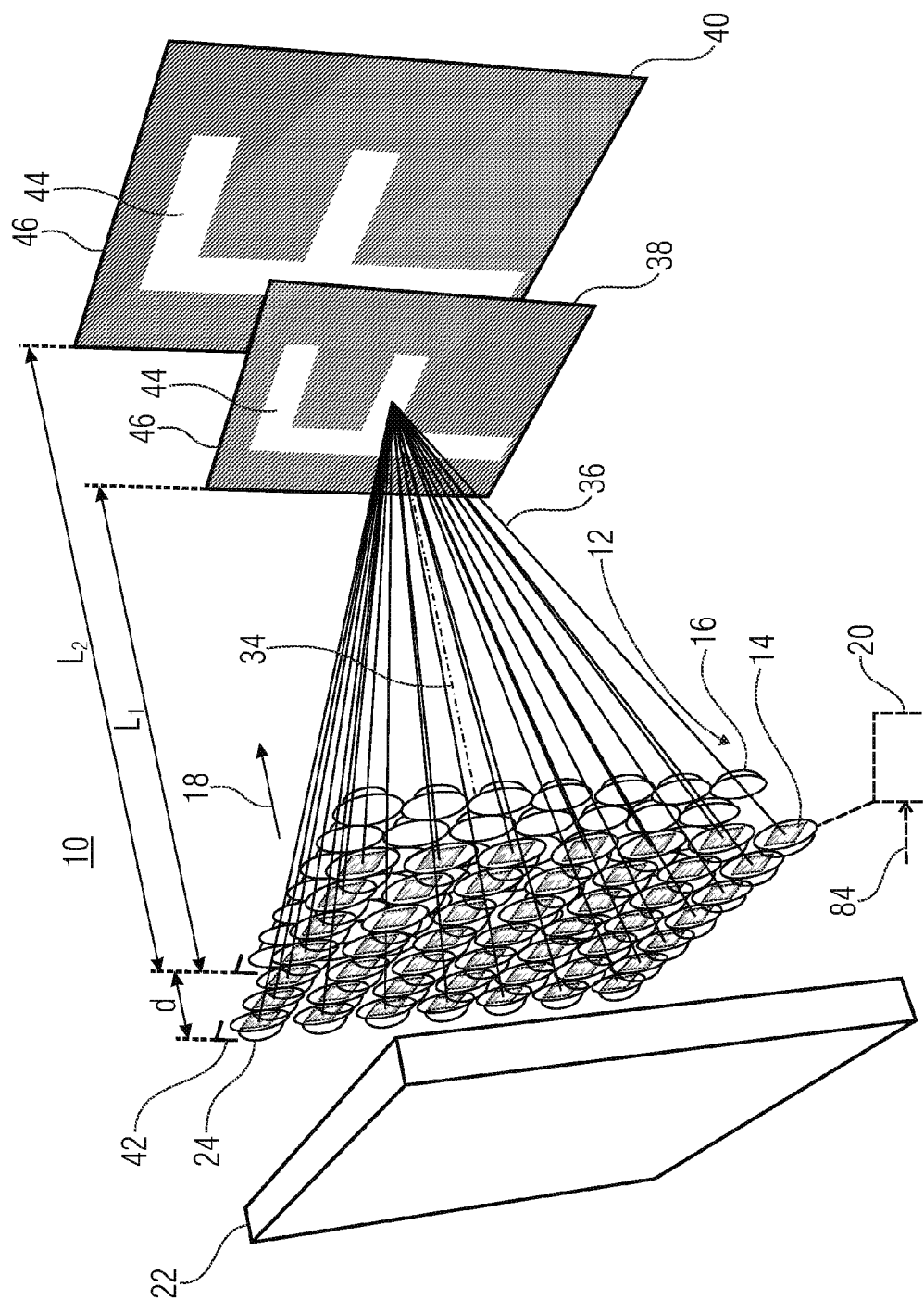
FIG. 1 shows a schematic three-dimensional view of a multi-aperture projection display according to an embodiment with real projection.

First of all, FIG. 1 shows the structure of a multi-aperture projection display according to an embodiment. The multi-aperture projection display includes a plurality of laterally adjacent projection channels 12, i.e., a projection channel array. Each projection channel has a single image generator 14 for generating a respective single image and optics 16 for mapping the respective single image residing in an object plane 42 of the optics 16 into a projection direction 18 of the multi-aperture projection display 10. The single image generators 14 are, for example, shadow masks that can be backlit. The same can be formed, for example, of parts of a common shadow mask. The single image generators 14, however, can also be self-luminous elements, such as OLEDs having illuminating areas corresponding to the respective single image of the respective channel 12. The single image generators could also be displays, for example, that are able to display varying image content, wherein in this case a control 20 would exist for adjusting the image content of the single image generators to the respective single images, as will be described in more detail below. For backlighting, if present, a planar light source 22 as shown exemplarily in Fig. could be used, or one light source per channel 12. The planar light source 22 is, for example, an OLED, an LED array or the same. The planar light source 22 could be implemented to emit an already pre-collimated backlighting light. In the projection direction 18, planar light source 22, image generator 14 and optics 16 are connected in series, such that the backlighting passes through transmissive portions of the single images of the single image generator 14 and the bright portions of the single images are mapped by the optics 16 into the projection direction 18, where the same are superposed in a suitable manner so as to result in an image to be projected, as will also be described in more detail below. For obtaining Köhler backlighting, optionally, one collimator 24 can be provided per projection channel 12; in this way, the light flux through the channels 12 and, hence, the light yield can be increased.

Figure 2:
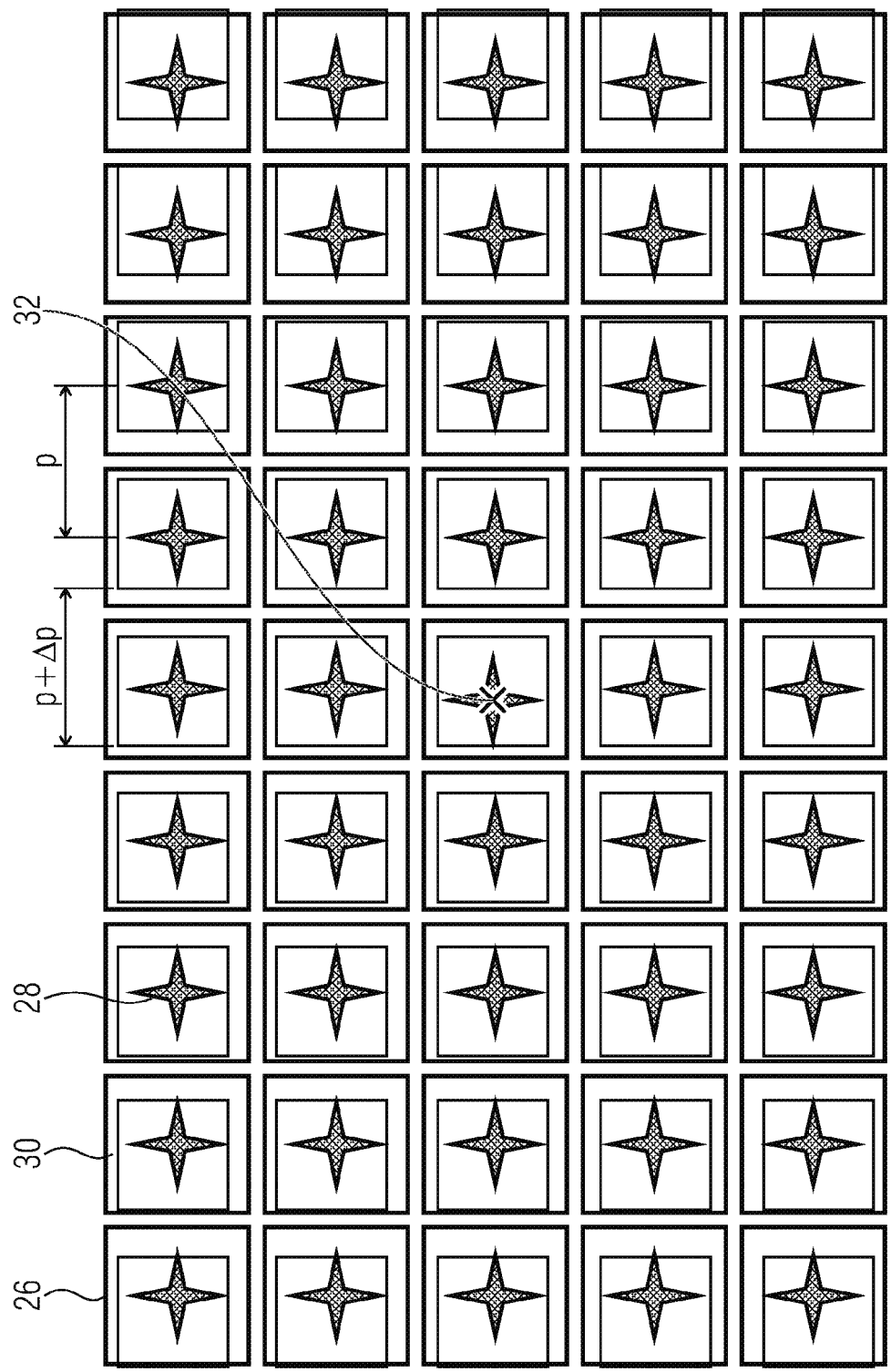
FIG. 2 shows a top view of the multi-aperture projection display of FIG. 1 for illustrating relative positions of optics and single images of the individual channels according to an exemplary example.

FIG. 2 shows a top view of the array of channels 12 with array of optics 16, whose apertures 26 are shown here exemplarily as squares and whose entrance pupil positions 28 are exemplarily indicated by stars. As can be seen in FIG. 2, the optics can be arranged regularly in an array of rows and columns, but any other arrangement is also possible. Additionally, the entrance pupils 28 can be arranged centrally to the respective apertures 26 but variation options exist here as well. FIG. 2 also shows the array of single images 30 of the single image generators. The same also form a lateral arrangement. In particular, the single images 30 are positioned in a lateral arrangement which is geometrically similar to the lateral arrangement of the entrance pupils 28. In the case of FIG. 1, the same results from a centric extension around a center 32 of the array of entrance pupils 28 from the arrangement of entrance pupils 28.

Optionally, a translatory offset relative to the array of entrance pupils 28 can be added. Here, the center of the single image arrays and the center of the entrance pupil array coincide. The optical axis 34 of the multi-aperture projection displays 10, as indicated in FIG. 1, passes through the just stated centers. Deviations from the geometric similarity would also be possible, for example, for performing adaptations to curved screen geometries. This is not the case in FIG. 2.

Before continuing with the further description, some general statements will be made. In FIG. 1 it has been exemplarily assumed that the single image generators are shadow masks 14, such as chrome masks having dark portions or blocking portions and bright portions or transmissive portions. However, it is also possible to use a reflectivity of masks instead of backlighting. In other words, the single image generators 14 could also be reflective masks having bright or reflective portions and dark or non-reflective portions. The front lighting could be realized by a light conductor plate which is arranged between optics array and single image generator array, is illuminated from the side and transmits reflective light to the optics 16 at the reflective portions of the masks 14 on its side facing the single image generators 14. In the case of self-luminous single image generators, in a similar manner, also bright or self-luminous portions exist and dark or non-luminous portions and, in the following, the bright portions are sometimes called non-zero-valued portions and the dark portions zero-valued portions. OLEDs would be an option for forming fixed single images and displays or imagers, such as LCDs or the same, examples for adjustable single image generators that can change their respective image content. As mentioned, the single image generators 14 can also represent different parts of an individual single image array generator, such as an array of portions of a mask, an array of portions of an imager.

The distance of the projection optics 16 to the single images or single image generators 14 or the distance between the array of optics 16 and the array of single images 13 or the array of single image generators 14 indicated exemplarily by d in FIG. 1, corresponds approximately to the focal length F of the individual projection optics 16. Thus, with relation to each individual channel 12, the single images 26 are mapped along the optical axis 36 specific for the respective channel 12 with a very large depth of focus reaching to infinity. In the case that all single images 30 are equal to one another, a focused image would result at a projection distance $L_1$ which depends, and described above, on the center distance difference $\Delta p$ between single images 30 and entrance pupils 28.

As will be defined in more detail below, according to embodiments of FIG. 1, the single images 26 are not equal to one another but, rather, the same are designed in a suitable manner such that the mappings of the single images 30 of the projection channels 12 are superposed at at least two different projection distances $L_1$ and $L_2$ to respectively one projected image 38 or 40, wherein the single images are darkened more with respect to a positive superposition at locations where non-zero-valued portions of the projected images at least partly reside when back-projected via the optics 16 of the projection channels 12 into the object plane 42, where the single images 30 lie, but no superposition of all of them, than at locations where the non-zero-valued portions of the projected images 38 and 40 are all superposed with one another when back-projected via the optics 16 into the object plane 42. In the following, this will be explained in more detail but, for the time being: if a screen is held in front of the projection display 10, such that the screen is arranged behind the projection display 10 in mapping direction 18, it can be seen that the image projected onto this screen has a maximum focus at the distances $L_1$ and $L_2$ from the projection display 10. The single images 30 are specifically designed for these distances, as will be described in more detail below. These are set distances. These images have bright portions 44 and dark portions 46. In the case of FIG. 1, this is exemplarily the depth of focus extension case and, hence, the case where the projected images 38 and 40 are those that can be converted into one another by centric extension or projection onto the point 32, i.e., the intersection between optical axis 34 and entrance pupil plane but, in the following, it will be described that this is merely an example. If the back projection of these projected images 38 and 40 is considered separately, each of these projected images 38 or 40 will generate bright portions and dark portions, i.e., non-zero-valued and zero-valued portions in the object plane 42, where the single images lie.

The non-zero-valued portions of the back projection of the different images 38 and 40 overlap only to a certain extent. At locations where at least one non-zero-valued portion of one of the images 38 and 40 lies due to back projection, but these non-zero-valued portions do not completely overlap, i.e., not from all images 38 and 40, i.e., at locations onto which a bright portion 44 of only one of the images 38 or 40 is back-projected, the single images 30 of the single image generators 14 are now darkened, namely darkened compared to the comparative case where the back projections were combined additively or by an OR-operation for obtaining positive superposition.

The above described matter will be illustrated in more detail based on the specific example as illustrated in FIG. 1, namely based on the projection of a bright object, here a letter "F" onto two perpendicular planes at the distances $L_1$ and $L_2$, in the following sometimes called "screen planes" for simplicity reasons. And extension to any number of (intermediate) distances by other images is obvious. First, the set distances $L_1:L_2=1:2$, are considered, where the desired superposition figures are to occur. According to equation (3), a unique slide array or an array of provisional single images results for both set distances. Due to the logic AND-operation (intersection) of the transmissive areas of both slide arrays, merely those area elements are maintained which provide a constructive contribution to the overall image at both projection distances. FIG. 3 shows exemplarily a top view of the result of a back projection of the two projected images 38 and 40 shown in FIG. 1 at the distances $L_1$ and $L_2$ onto the object plane 42, wherein circles in FIG. 3 exemplarily indicate the position of the optics apertures 26. Here, the same are exemplarily illustrated as lying adjacent to one another in a hexagonal arrangement which is tightly packed. Above this, FIG. 3 exemplarily assumes a lower single image center distance compared to the aperture center distance, wherein such embodiments will be described below. The basic idea of FIG. 3, however, also applies to the embodiment of FIG. 1, namely that the back projection of the bright portions 44 of the closer image 38 having the distance $L_1$ results in the non-zero-valued or bright portion 48 in the object plane 42 in the individual channels, wherein those portions 48 are illustrated in FIG. 3 in a shaded manner from the right top to the left bottom, while the bright portions 44 of the projected image 40 at the greater distance $L_2$ results in non-zero-valued or bright portions 50 in the object plane 42 in the channels 12, which are illustrated in a shaded manner in FIG. 3 from the left top to the right bottom. Due to the greater distance $L_2$, the images 50 resulting from the back projection of the image 40 have a lower center distance to one another than the images 48 resulting from the back projection of the image 38 at the lower distance $L_1$. For this reason, the intersection or overlap where the bright areas 48 and 50 overlap differs from channel to channel. As can be seen in FIG. 3, the overlap has a smaller area the further the respective channel is apart from the optical axis 34 of the multi-aperture projection display. The intersection areas where both non-zero-valued portions 48 and 50 in the respective channels overlap are illustrated in FIG. 3 by the dark areas 52.

According to an embodiment, each single image 30 is selected such that the areas 48 and 50 beyond the intersection areas 52 are darkened. Thus, in the mask embodiment, the masks are not transmissive there. The same are merely transmissive in the overlapping area 52. This is again described in FIG. 4a which shows, like FIG. 3, a top view of the object plane 42, i.e., a top view of the resulting single images 30, whose non-zero-valued portions, e.g., transmissive portions correspond to the intersection areas 52 of FIG. 3.

FIG. 4b shows exemplarily the contribution or the bright area 53 resulting by an exemplarily taken channel 12' at the distance $L_1$, in relation to the bright portion 44 as it results by superposition of the single images or the bright portions 52 of all channels in the image 38 at this distance $L_1$. In the attempt of explaining why the area 44 at the distance $L_1$ in the image 38 still forms a "fine" "F", FIG. 4c shows the contribution resulting from the transmissive area of the single image 30 of any other arbitrary channel 12", wherein this area is again indicated by 53 in its relative position in the overall area 44. Obviously, the same covers other parts of the area 44 than the channel 12' at the distance $L_1$. FIGS. 4d and 4e show the contribution 53 for the exemplarily selected channels 12' and 12" according to their contributions 53 to the bright area 44 of the projected image 40 in the distance $L_2$, FIG. 4d for the channel 12' and FIG. 4e for the channel 12". Again they cover different parts of the image or the bright area 54 of the image 40. Again, other channels cover other zones of the areas 44 in the images 38 and 40 which results exactly in the desired areas 44.

In other words, according to the just described embodiments, for obtaining the mask array of FIG. 4a, first, it is checked for all elements of the overall object structure, i.e., for the transmissive areas of the mask array of masks 14 whether the same provide a transmissive portion for all patterns belonging to the projection distances $L_1$ and $L_2$, i.e., whether the same lie within the overlap area 53. If this check is positive, the same will be maintained, otherwise the same will be removed from the resulting object structure or the masks, i.e., such locations are darkened or made non-transmissive. Mathematically, this corresponds to an element or location selective AND-operation, i.e., the intersection 52 of all object structures 48, 50, each allocated to a projection distance. Thus, FIG. 4A shows the resulting mask structure according to the just described intersection check.

In other words, according to the above embodiment, a unique stamp or transmissive structure is generated in each channel, which provides at both or several set distances or even in a continuous projection depth area such a contribution to the overall overlap that the contours of the respective set images or the set image are maintained at the respective set distances.

A consistent description of both the image projection variable according to distance and the extended depth of focus will follow.

Figure 5:
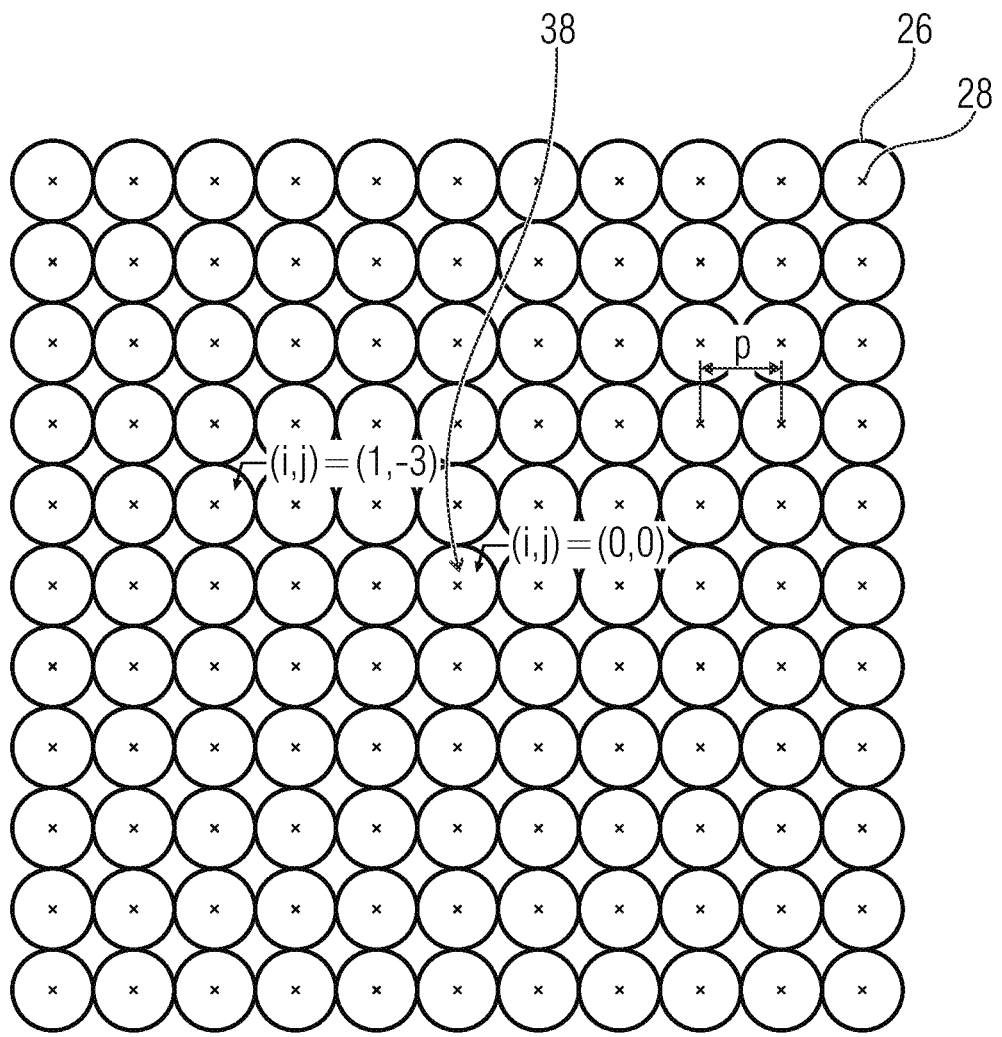
FIG. 5 shows schematically an array of projector lenses arranged in a square as well as a notation for indexing the channels used in the description.

The object structure plane is considered and the coordinate origin is placed at its center. $\text{Pattern}_{L_k}(i,j) \cup \mathbb{R}^2$ describes, for the lenslet or channel 12 $(i,j)$, wherein, as illustrated in FIG. 5 $(i,j)$ indicates exemplarily the lateral position measured from the positon relative to the optical axis 38 measured in units p, the pattern to be mapped for the distance or the geometry $L_k \in \mathcal{L}$. For the array projector of [2] $|\mathcal{L}|=1$, i.e., there is only one geometry onto which mapping is to be performed in a focused manner. The present invention allows the generation of a focused image for two or more geometries $\mathcal{L} = \{L_1, \ldots, L_n\}$. This can be the same pattern (depth of focus extension) or also different patterns for different distances.

A desired image $\text{image}_{Lk}$ is given for a specific projection distance $L_k$ (here, simplified: perpendicular screen). Generalization to freeform screen geometries is possible according to [3]. According to the mapping rules (equation (3)), the following slide or object structure $\text{Pattern}_{Lk}(i,j)$ results for an array (image 13) arranged in a square on the object side for the individual channel $(i,j)$:

$$\text{Pattern}_{L_k}(i, j) =$$
$$\left\{(x, y) \in \mathbb{R}^2 : \exists (x_0, y_0) \in \text{Image}_{L_k} : x = \frac{x_0}{M_k} + j \cdot (\Delta p_x(L_k) + p_x)\right.$$
$$\left. \text{and } y = \frac{y_0}{M_k} + i \cdot (\Delta p_y(L_k) + p_y)\right\}$$

Here, $$M_k = \frac{L_k}{s}$$

is the mapping scale for the k-th projection distance $p_x = p_y = p$ of the distance of the lenses of this array and $$\Delta p(L_k) = \Delta p_x(L_k) = \Delta p_y(L_k) = \frac{s}{L_k} \cdot p = \frac{1}{M_k} \cdot p$$

is the projection distance dependent center distance difference. Now, by $\text{Pattern}_{intersection}(i,j)$ those area(s) are described that result in the channel $(i,j)$ by the following AND operation:

$$\text{Pattern}_{Intersection}(i,j) := \cap_{L_k \in \mathcal{L}} \text{Pattern}_{L_k}(i,j) \text{ and}$$
$$\mathcal{L} = \{L_1, \ldots, L_n\}.$$

The overall transmission of such a projection system is proportional to the sum of the transmissive areas of the individual slides. Here, for the illuminated area content of a channel $A_{pattern}(i,j)$ the following applies:

$$A_{Pattern}(i,j) := \iint I_{Pattern_{Intersection}(i,j)}(x,y) dx dy$$

Here, I is the indicator function (or also characteristic function) and is defined as follows:

$$I_M(x, y) = \begin{cases} 1, & \text{if } (x, y) \in M \\ 0, & \text{else} \end{cases}$$

The transmissive overall area of all projection channels $$A_{overall} = \Sigma_{i,j} A_{Pattern}(i,j).$$

is significant for the overall transmission of a projector arrangement generated according to this method.

Figure 6:
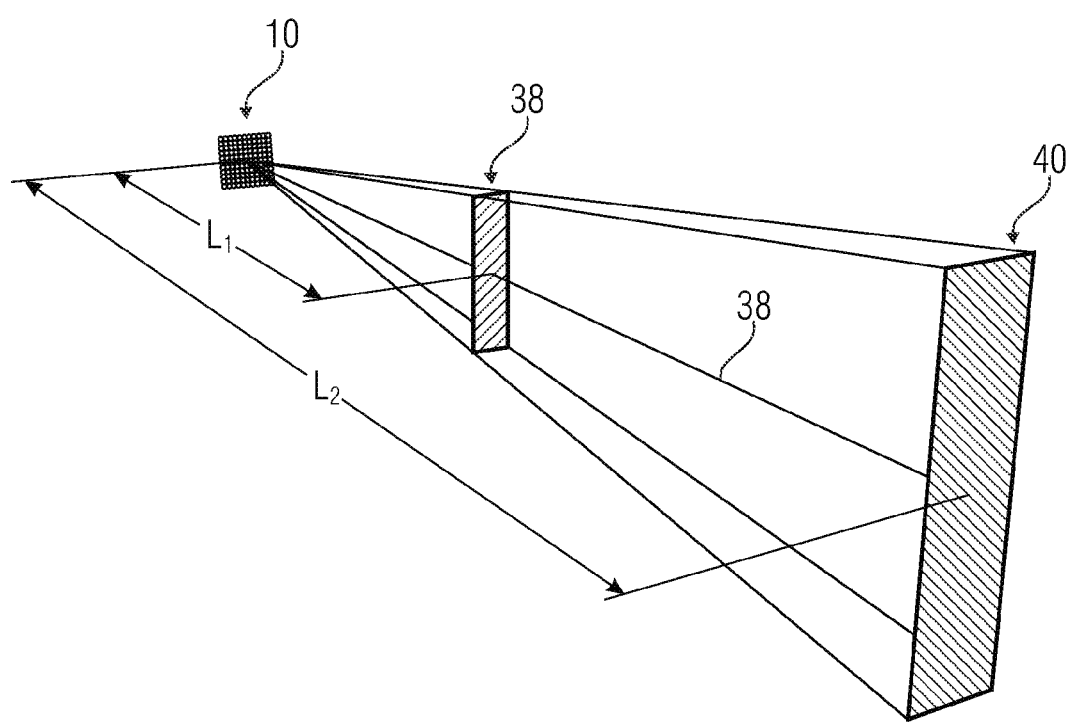
FIG. 6 shows a three-dimensional view of an exemplary positional relationship between the multi-aperture projection display of FIG. 1 and exemplarily projected images resulting in an extension of the depth of focus (EDoF), wherein, in particular, the set light distributions in both set distances are illustrated here exemplarily in the form of a rectangle that is enlarged according to the mapping scale.

As example 1, a centered rectangle is described which is, in the screen plane, ($L_1$=400 mm the measure width× height=$B_1 \times H_1$=5 mm×20 mm and in $L_2$=800 mm according to the screen distance ratios $L_2:L_1$=2:1) $B_2 \times H_2 = 2 \cdot (B_1 \times H_1)$ =10 mm×40 mm (FIG. 6).

$$\text{Pattern}_{L_1}(i, j) = \{(x, y) \in$$
$$\mathbb{R}^2 : -\frac{1}{2}\frac{B_1}{M_1} + j \cdot (\Delta p_x(L_1) + p_x) \leq x \leq +\frac{1}{2}\frac{B_1}{M_1} + j \cdot (\Delta p_x(L_1) + p_x)$$
$$\text{and } -\frac{1}{2}\frac{H_1}{M_1} + i \cdot (\Delta p_y(L_i) + p_y) \leq y \leq +\frac{1}{2}\frac{H_1}{M_1} + i \cdot (\Delta p_y(L_1) + p_y)\}$$

$$\text{Pattern}_{L_2}(i, j) = \{(x, y) \in$$
$$\mathbb{R}^2 : -\frac{1}{2}\frac{B_2}{M_2} + j \cdot (\Delta p_x(L_2) + p_x) \leq x \leq +\frac{1}{2}\frac{B_2}{M_2} + j \cdot (\Delta p_x(L_2) + p_x)$$
$$\text{and } -\frac{1}{2}\frac{H_2}{M_2} + i \cdot (\Delta p_y(L_2) + p_y) \leq y \leq +\frac{1}{2}\frac{H_2}{M_2} + i \cdot (\Delta p_y(L_2) + p_y)\}$$

Figure 7:
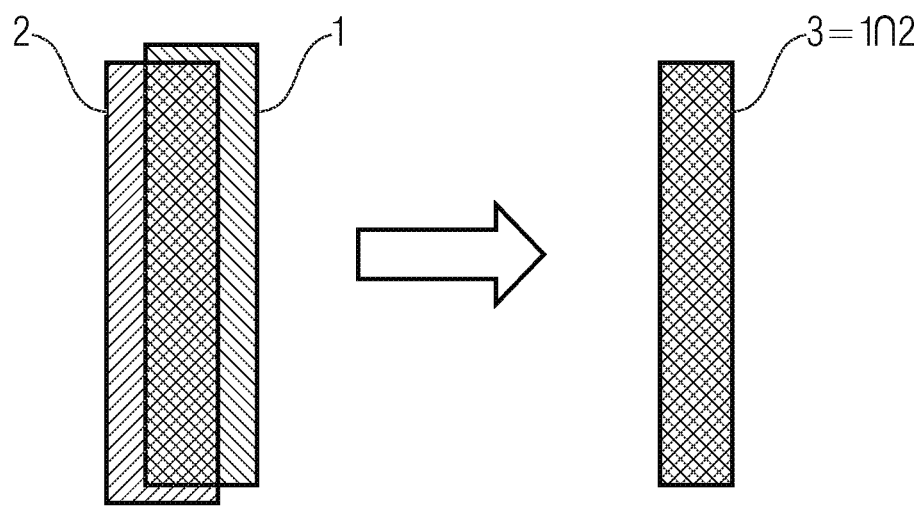
FIG. 7 shows a schematic view illustrating how a final single image having the area pattern$_{intersection}$ results by object structures in the projector channel (2, 4) of FIG. 5 in the shape of pattern $L_1(1)$ and pattern $L_2(2)$ by an intersection examination.

For $(i,j)=(2,4)$, $\mathcal{L} = \{400 \text{ mm}, 800 \text{ mm}\}$ and p=0.8 mm (with array structure of FIG. 5) for the following rectangle, object structures analogous to FIG. 7 result:

$\text{Pattern}_{Intersection}(2,4) = \{(x,y) \in \mathbb{R}^2 : 3.2035 \text{ mm} \leq x \leq 3.2205 \text{ mm and } 1.558 \text{ mm} \leq y \leq 1.654 \text{ mm}\}$ This describes the transmissive area (cf. FIG. 7) for the lenslet (2,4). For the transmissive area of this exemplarily selected projector lenslet, the following results:

$A_{pattern}(2,4) := \iint I_{Pattern_{Intersecion}(2,4)}(x,y) dx dy = 1.632 \cdot 10^{-3}$ mm$^2$.

If the transmissive area of the entire array projector is compared to the extended depth of focus with the one of a conventional one according to [2], a relative light loss of 26% results.

$$\frac{\sum_{i,j=-5}^{5} A_{Pattern}(i, j)}{121 \cdot A_{Pattern}(0, 0)} \approx 74\%$$

The depth dependent mapping characteristics of an array projector with manipulated object structures according to the invention depends heavily on the light patterns to be projected and differs fundamentally from the ones of a conventional single channel projection system.

Exemplarily, a greatly simplified example will show below in as much the mapping of a simple bright-dark edge behaves for the different optical systems to subsequently be able to compare two equivalent systems.

In the following, it is examined based on a bright-dark edge how the optical mapping of an array projector differs from the one of a conventional single channel projector or array projector with single set distance. Here, a differentiation is to be made in:
a) the projection distance of the individual channels $L_{foc}$, given by the back focal lengths of the projection optics (in the example 533 mm) and
b) the set distances at which a focused image is to be generated by the above described arrangement or method (in the example: 400 mm and 800 mm).

Figure 8:
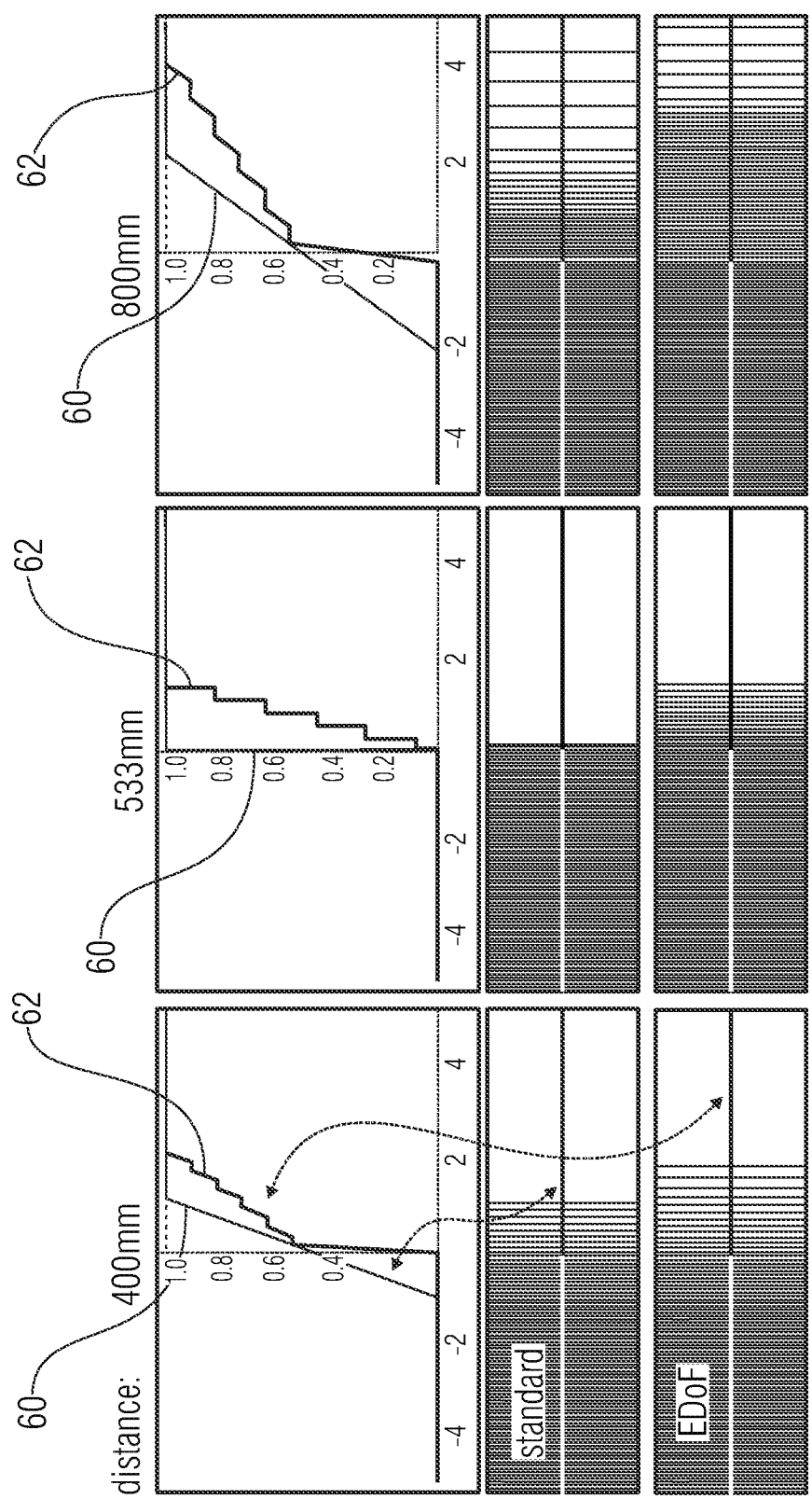
FIG. 8 shows a comparison of the mapping characteristics of a bright-dark edge by a conventional projector and an array projector with EDoF at different projection distances.

FIG. 8 shows the result of an analytical simulation of the mapping of a bright-dark edge for a conventional projector (curve 60) and an array projector with extended depth of focus (EDoF). In particular, FIG. 8 shows a comparison of the mapping characteristics of a bright-dark edge by a conventional projector (curve 60) and an array projector with EDoF (curve 62) at 400 mm, 533 mm and 800 mm. The abscissa in the diagram corresponds to the lateral coordinate in the image space. An area having an expansion of 10 mm is illustrated. The single channel projector has a lateral expansion of 8.8×8.8 mm (square aperture), while the array of 11×11 individual projector lenslets consists of a single expansion of 0.8×0.8 mm. The back focal length of each projector lenslet is set to 533 mm according to mapping equation. The set distances of the array projector with EDoF are at 400 mm and 800 mm.

From the analysis, it can be seen that the suggested arrangement can improve the visibility of image edges across a wide projection distance range. In the images, it becomes clear that in contrary to the classic single channel projector both an asymmetric blur behavior when mapping at non-set distances as well as a shift of the edge center $K_{center}$ occurs.

The same can be defined as follows:

$$Kcenter_{EDoF}(L) = \arg\min_{x} |\text{Intensity}(L, x) - 0, 5|$$

This results in the (relative) intensity of the superposition of all channels by considering the washout occurring due to defocusing.

Due to the asymmetric edge expansion behavior in the image space it is necessitated to differentiate the following cases: The margin of the edge expanding into illuminated areas, is referred to by $K_{bright}$. Analogously, $K_{dark}$ characterizes the margin of the edge into dark image areas:

$$Kdark_{eDoF}(L) = \max\left(\arg\min_{x}(\text{Intensity}(L, x))\right)$$

$$Kbright_{eDoF}(L) = \min\left(\arg\min_{x}(\text{Intensity}(L, x))\right)$$

Figure 9:
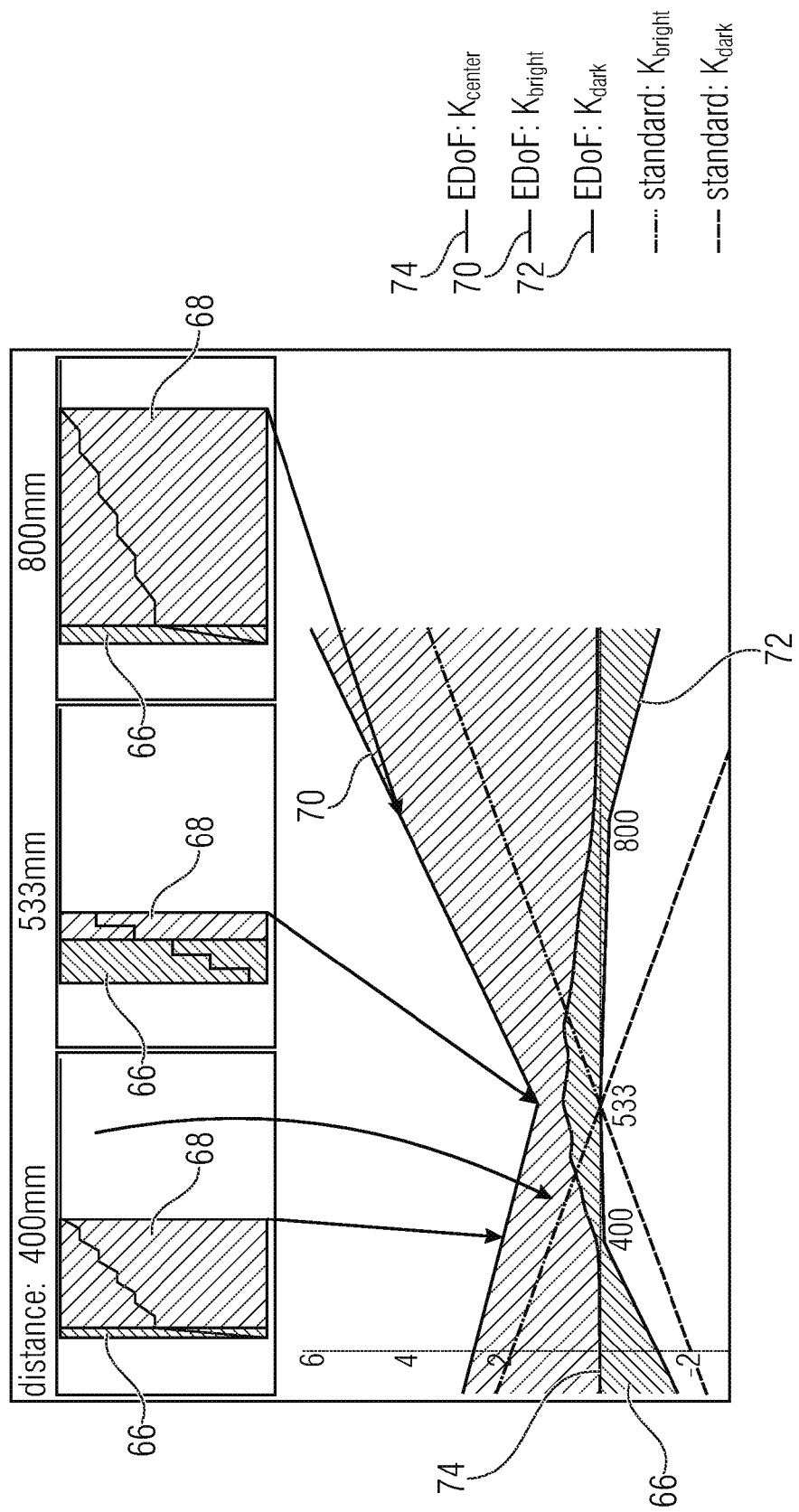
FIG. 9 shows schematically the edge expansion behavior of a conventional projector and an array projector with EDoF.

These equations apply for the exemplarily selected bright-dark distribution (left-dark, right-bright). The inverse case results analogously. For the selected projection distances, here exemplarily 400 mm, 533, 800 mm, FIG. 9 shows at the top the area of the dark edge area 66 and the bright edge area 68. At the bottom, the blur behavior of a conventional projector is illustrated with dotted lines and an array projector with EDoF (areas). Both systems have an identical overall aperture of 8.8×8.8 mm². Both the asymmetric edge washout (curves 70, 72) and the edge shift (curve 74) are clearly visible.

The illustrated shift of the edge positions can be counteracted by adapting the light patterns at the set distances.

The effect is as follows: A conventional single channel projector is defined by the following parameters: aperture: D=8.8 mm (square), focal length: $L_{foc}$=533 mm, and in the following it will be examined how much its pupil would have to be reduced in order to have the same blur behavior with respect to the suggested arrangement at a distance of 400 mm and 800 mm. The evaluation of equation (3) shows that the pupil of the single channel projector would have to be limited to 1.46 mm, which corresponds to a reduction of the light flux to approximately 3%. By using the arrangement suggested herein for extension of depth of focus (EDoF), this value is opposed by a light flux of approximately 74% (example: bright rectangle, see above). Here, it should be noted that this transmission loss of the suggested system heavily depends on the image to be projected or the selected set distances. For typical image contents and projection distances, values of >60% are to be expected.

Figure 10:
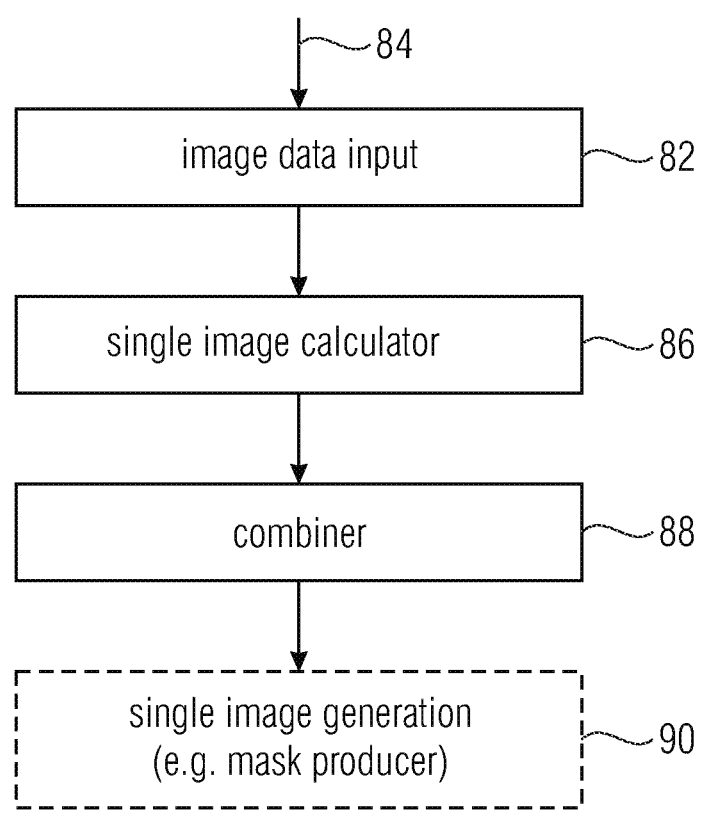
FIG. 10 shows schematically a block diagram of an single image generator according to an embodiment.

With reference to the above statements, FIG. 10 shows an embodiment for a single image generator for a multi-aperture projection display having a plurality of projection channels. Generally, the single image generator is indicated by reference number 80. The single image generator 80 of FIG. 10 includes an image data input 82 for receiving image data 84 representing at least two images to be projected at different projection distances, such as the images 38 and 40 at the distances $L_1$ and $L_2$. Further, the single image generator 80 includes a single image calculator 86 that is implemented to calculate, for each of the at least two images to be projected, a provisional single image per projection channel 12 of the multi-aperture projection display such as, for example, exactly those images 48 and 50. A combiner 88 of the single image generator 80 combines, for each projection channel, the provisional single images of the respective projection channel calculated for the at least two images to be projected to a final single image for the respective projection channel, such as exactly those final single images as illustrated in FIG. 4*a*. As mentioned, extensions to more images to be projected etc., is also possible.

Basically, FIG. 10 also represents the steps of a respective single image generation method, namely receiving image data at 82, calculating provisional single images at 86 and combining the same at 88. The following detailed function description is thus also understood as a description of the respective method.

Before the image generation according to FIG. 10 will also be described in more detail, it should be noted that the image generation according to FIG. 10 can be performed offline or online. This means the following. Single image generation, for example in the embodiment of FIG. 1, could be performed within the control 20. Then, it would be possible to feed in image data 84 indicating the desired images 38 and 40, and the single image generation then controls the single image generators 14 of FIG. 1 accordingly, such that the same indicate the finally calculated single images. However, the single image generator or the single image generation method of FIG. 10, can also be a pure design tool or part of a production method for producing the single image generators 14, such as the masks, in the case that the single image generators 14 are formed of masks. The latter alternatives are summed up in a dotted box 90 in FIG. 10, which is indicated by "single image generation". Thus, the same can be a mask generator or mask generation. As an alternative, the result of combining 88 could also be outputting data, for example in stored form, on a suitable data carrier, which represents the arrangement of single images 30 as it results from the combination.

A simple case as described above is that the image data 84 represent the at least two images 38 and 40 to be projected in a binary manner, i.e., exclusively comprising merely bright areas 44 and dark areas 46. In this case, the single image calculation in the calculator 86 calculates, for example, for each of the images 38 or 40 to be projected, the array of provisional single images 30 such that, for each image 38 or 40 to be projected, the respective array of provisional single images or the provisional single images themselves represent a back projection via the array of optics 14 into the object plane 42. The result would be binary provisional single images, as indicated exemplarily in FIG.

3 at 48 or 50. This means the calculation would be performed by using optical parameters of the multi-aperture projection display 10, such as optical mapping parameters, such as the projection distances $L_1$, $L_2$, the aperture center distances p, the object distance d and possibly optionally further parameters. However, the calculation can also be more complex. In particular, the same does not have to be unique. For example, it would be possible to perform the calculation for projection planes that are not perpendicular to the optical axis 34 or even curved, for which reference is made exemplarily to [3]. Image portions can be distributed differently to the channels, such as for increasing the focus.

Then, the combiner 88 performs the combination of the binary provisional single images or the arrangement of binary valued provisional single images, such as by the above mentioned logic operation, namely an AND-operation in the case that the logic 1 corresponds to the bright portions and a logic OR-operation in the case that the logic 1 corresponds to the dark portions. The result would thus be a final binary single image per channel or an arrangement of such final single images with dark or bright portions which can represent, for example, transmissive, reflective or self-luminous portions, as described above. In the case of transmissive masks, respective chrome masks would be produced as has also been described above. Otherwise, a pixelated imager is controlled in a suitable manner for indicating the bright or dark areas.

Another option is that the images to be projected 38 or 40 are not represented in a binary manner by the image data 84. Thus, the same can have a higher value, they can, for example, be trivalent. In this case, the single image calculator 86 distributes, for example, the differently valued portions of the images 38 and 40 to a different amount of channels 12 in its calculation, such that per image to be projected 38, the calculated provisional single images are binary, but, when the same are superposed, result in the multi-valued image to be projected 38 at the respective projection distance. The combination in the combiner 88 then functions again exactly as in the case of purely binary images to be projected 38 or 40.

It should be noted that it is an advantage of embodiments of the present invention that a maximum of a difference amount between the at least two different projection distances $L_k$, i.e., max($\{\forall i, j \leq$number of projection distances $$|L_i - L_j|\}) \text{ or } \max_{L_i, L_j \in \mathcal{L}}(|L_i - L_j|),$$

can be greater than the commonly obtainable depth of focus of the projection display for, for example, the average projection distance L of all projection distances $L_k$, i.e., greater than $$\frac{2DL^2\beta}{D^2 - L^2\beta^2},$$

wherein D is, overall, a pupil expansion of the optics of the projection channels, L an average value of the different projection distances and $\beta=0.005$. Thus, this is particularly interesting for the case that the images to be projected are indicated by the image data 84 such that the same actually result from one another due to centric extension at the intersection of optical axis 34 and entrance pupil plane, which has been described above as depth of focus extension.

Here, for example, the image data 84 can be already designed such that they exist in a format according to which, in the image data 84 of the different projection distances, only one image is contained, from which the at least two images to be projected result by the central extension in dependence on the respective projection distance.

Figure 11:
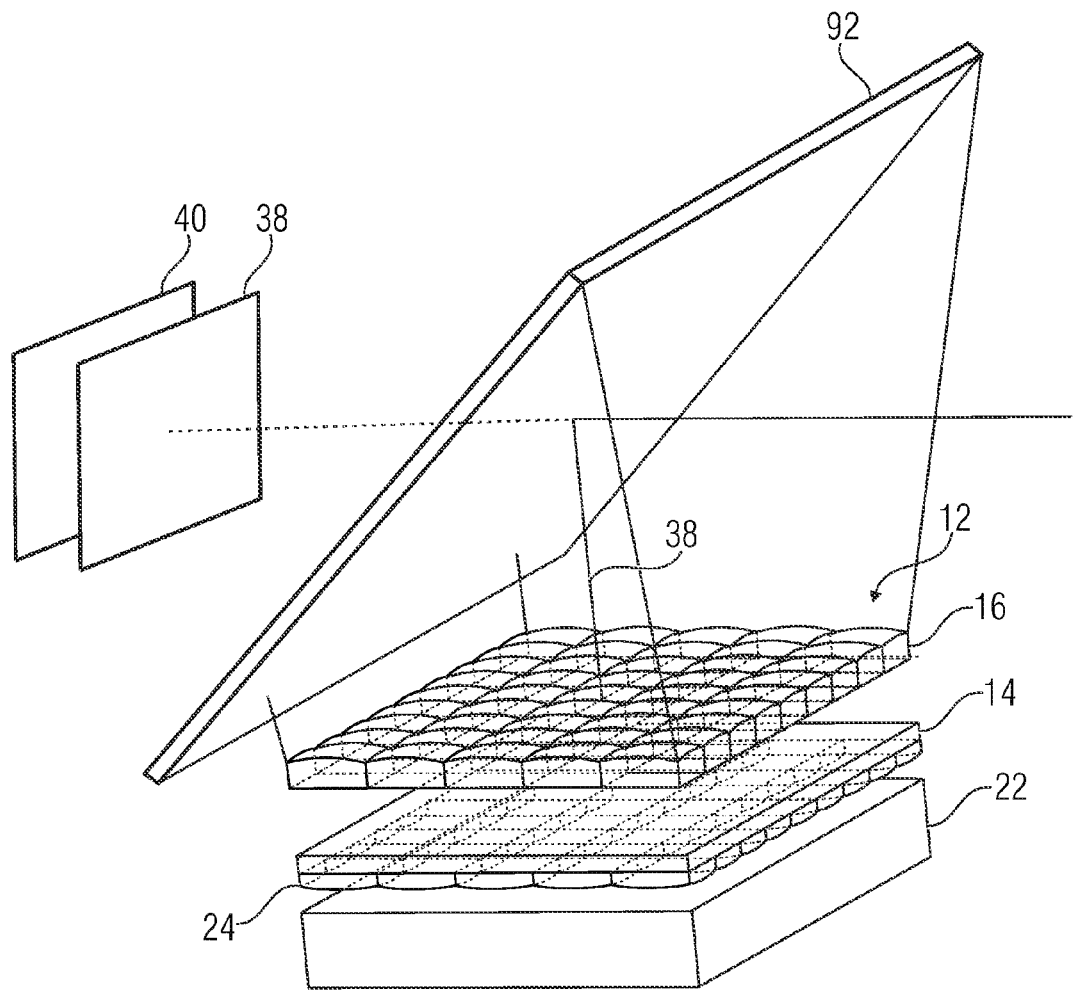
FIG. 11 shows a schematic spatial view of a multi-aperture projection display in the form of a single mirror system for mirroring virtual projection images according to an embodiment.
Figure 12:
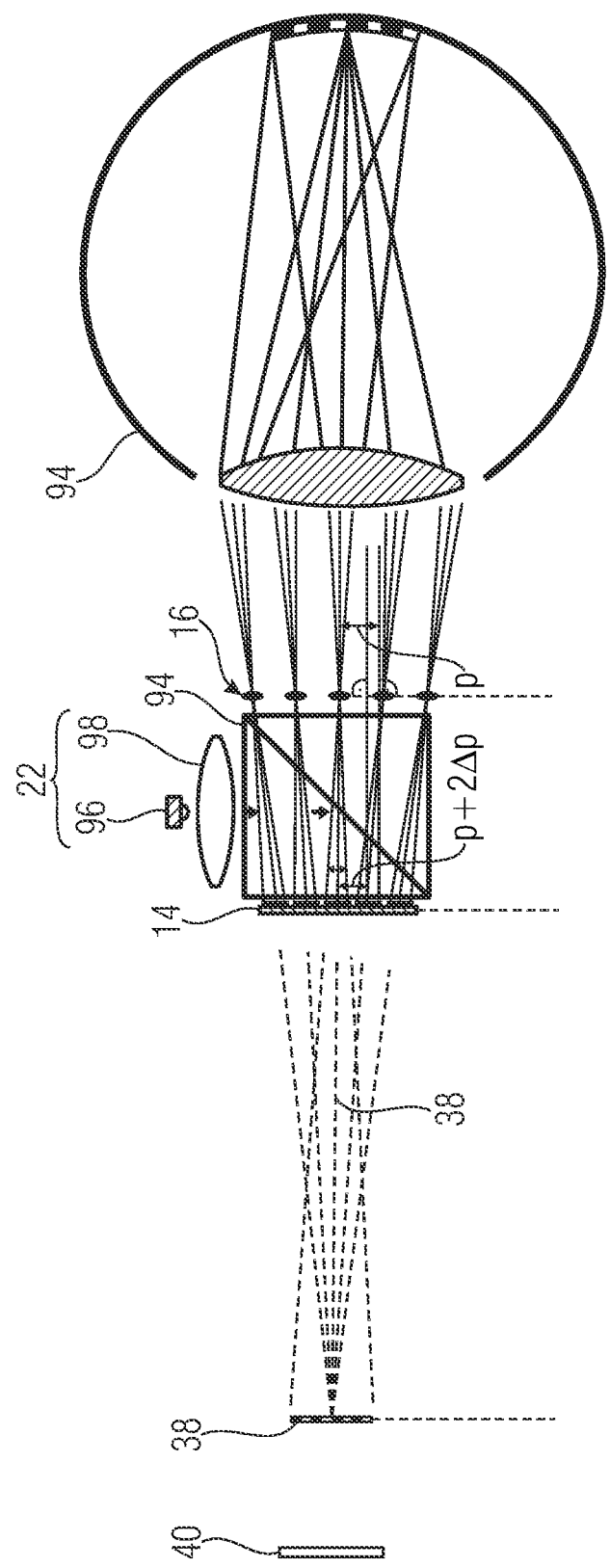
FIG. 12 shows a sectional view of a multi-aperture projection display for close eye application and fading-in of virtual image projections into an eye according to an embodiment.
Figure 13:
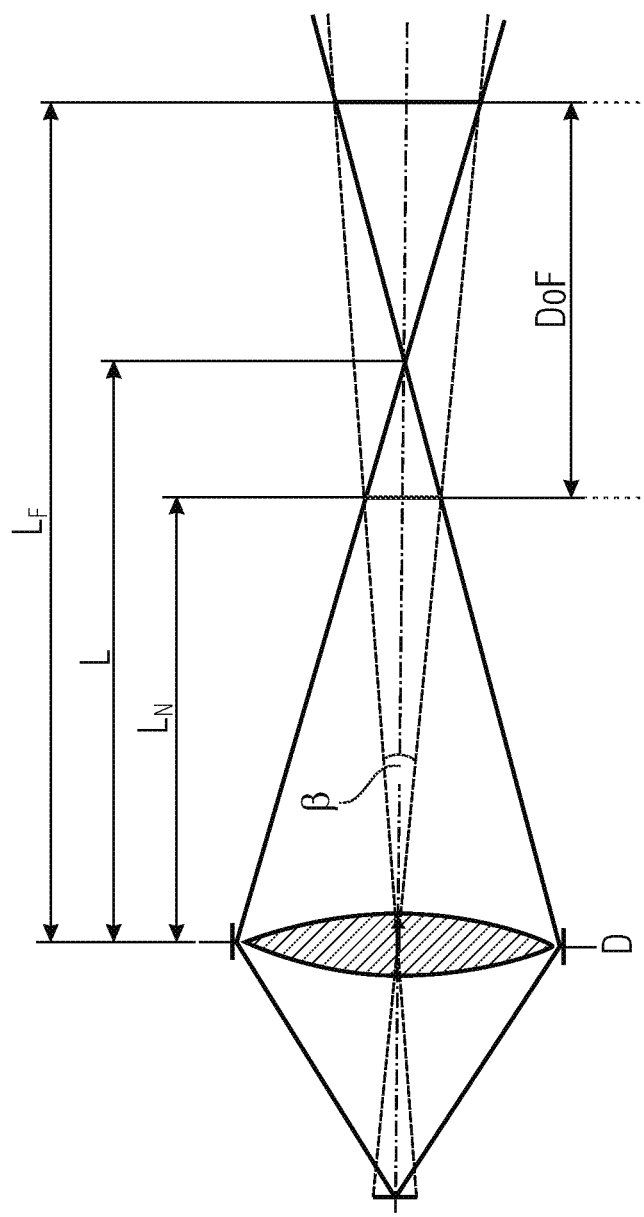
FIG. 13 shows schematically a single aperture projector and a schematic diagram for illustrating its depth of focus.
Figure 14:
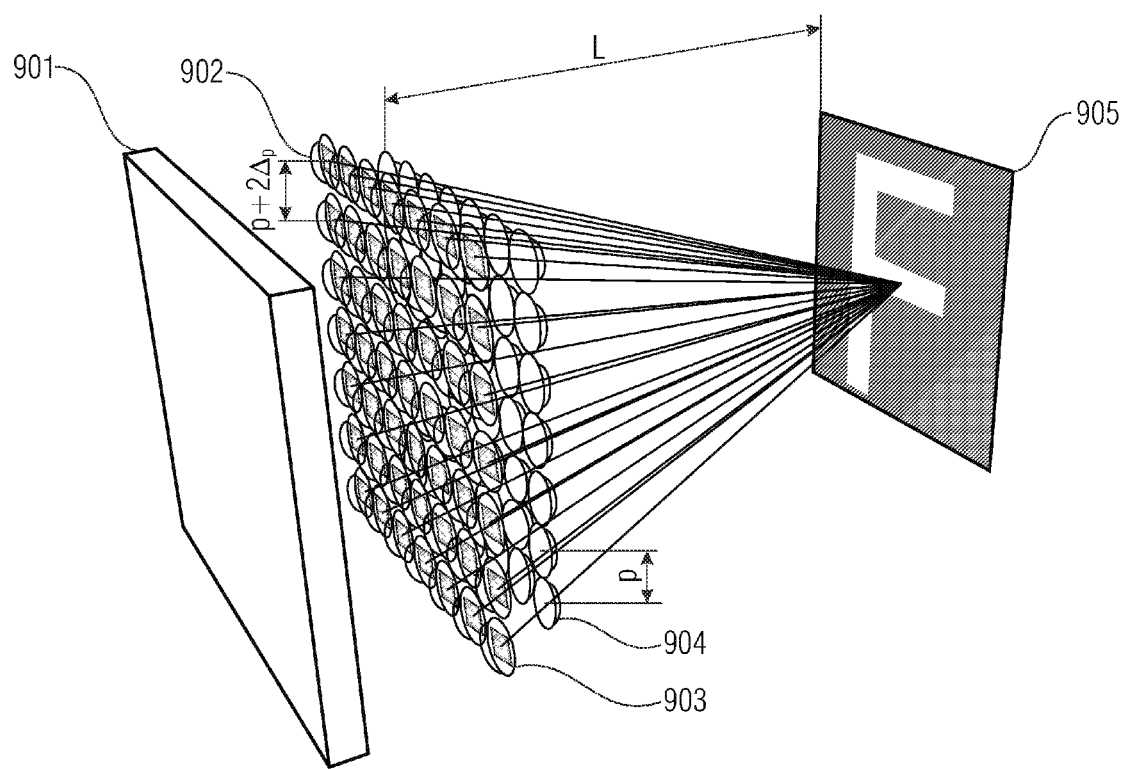
FIG. 14 shows schematically a three-dimensional view of an array projector with regularly arranged projection channels, exemplarily an arrangement of 7×7 individual projectors tightly packed in a square with planar backlighting.

Merely for the sake of completeness, FIGS. 11 and 12 also show that, according to other embodiments, a multi-aperture projection display having the advantages as described above might also be implemented as head-up-display for fading-in the images 38 and 40 as virtual images in the sight of a person via a suitable fading-in area, such as a window 92 of a vehicle or as near-eye display for fading in the images 38 or 40 as virtual images into the sight of the eye 94 of the viewer, such as in the form of electronic glasses. In the case of FIG. 11, the single image generators 14 are, for example, portions of a common mask or portions of a common display.

Contrary to FIG. 1, merely the entrance pupil center distance is greater than the single image center distance in the case of FIG. 11, wherein the expansion of the display, i.e., the area covered all-in-all by the projection optics aperture is determined by the expansion D (cf. FIG. 15) of the solid angle area where the display can indicate the images 38 or 40 to the user. In the case of FIG. 11, the individual channels 12 serve to cover the eye motion box of the person in the sight of whom fading-in is performed. In the case of FIG. 12, exemplarily, reflectively operating single image generators 14 are provided, such as reflective masks. Illumination is performed via a beam splitter 94 between the optics 16 and the single image generators 14. A light source 22 is formed by a divergent light source 96 and a collimator 98, which introduce collimated light laterally into the beam splitter 94, such that the reflective single image generators 14 are illuminated and reflect, at the positions defined by the single images, light by the beam splitter and the optics 16 into the eye 94, where the mappings of the single images are superposed in the retina for forming the virtual images 38 or 40.

The following remarks are made with regard to the above embodiments for eliminating the impression that the embodiments as described above cannot be extended or amended.

1) The above embodiments are particularly suited for projecting binary light patterns, but can also be extended to gray-level images by:
   Superposing different binary images having a defined number
   Superposing suitable gray value slides having a defined number
2) Generating colored image contents can be performed analogously to point 1). Possibly, the light pattern is to be separated into its primary color portions before performing the mathematical operations.
3) According to the De Morgan law $\neg(a \cup b) = \neg a \cap \neg b$), the described operation can also be applied to the absorbing parts of the object structures resulting respectively for all set distances. Instead of an AND-operation, a logic OR-operation results.

In the above embodiments, compared to a projection system of conventional technology as described in the introductory part of the description, there is the inherent option of projecting an alternating light pattern across the projection distance without further mechanical means. As a specific case maintaining a light pattern across a defined distance range will result. If the optical analogon to this is considered (depth of focus extension), compared to classical systems, a drastic gain of system transmission and, hence, efficiency increase will result. The above embodiments provide these advantages or the mapping characteristic of generating different patterns on different geometries or projection distances without the necessity of a separate control or control circuit.

Thus, above embodiments allow optical imaging of a plurality of high-contrast light patterns at different projection distances or screen geometries. A specific case, which is also covered by the described examples, is the maintenance of a fixed light pattern across varying project distances or geometries. While no technical solution is known when generating alternating image content, the significant technical advantage of increasing the depth of focus is a drastic increase of the effective system transmission. For generating the described mapping characteristics, no mechanical changes of lenses or pupils are necessitated. Merely the object structures are manipulated, in which the exact technical design has been described above. The restriction to the manipulation of image content allows the realization of simple, compact and robust protection systems.

Possible fields of application of the above embodiments for distance-dependent representation of different image contents and for extending the depth of focus are, for example, 3D measurement technology as well as structured illumination and information display.

While some aspects have been described in the context of an apparatus, it is obvious that these aspects also represent a description of the respective method, such that a block or device from an apparatus can also be seen as a respective method step or as a feature of a method step. Analogously, aspects described in the context of a method step or as a method step also represent a description of a corresponding block or detail or feature of a corresponding apparatus. Some or all of the method steps may be executed by (or using) a hardware apparatus, like for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, a hard drive or other magnetic or optical memory having electronically readable control signals stored thereon, which can cooperate or cooperate with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, wherein the computer program is stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can be electronical or optical. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, in some embodiments, the methods are performed by any hardware apparatus. The same can be a universally usable hardware, such as a computer processor (CPU) or hardware specific for the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] W. J. Smith, Modern Optical Engineering (McGraw-Hill, 2007).
[2] DE102009024894A1
[3] DE102011076083A1
[4] Marcel Sieler, Peter Schreiber, Peter Dannberg, Andreas Bräuer, and Andreas Tünnermann, "Ultraslim fixed pattern projectors with inherent homogenization of illumination," Appl. Opt. 51, 64-74 (2012).

The invention claimed is:
1. Single image generator for a multi-aperture projection display with a plurality of projection channels, comprising
an input that is implemented to receive image data representing at least two images to be projected at different projection distances;
a single image calculator that is implemented to calculate a provisional single image for each of the at least two images to be projected per projection channel of the multi-aperture projection display; and a combiner that is implemented to combine, for each projection channel, the provisional single images of the respective projection channel calculated for the at least two images to be projected to a final single image for the respective projection channel, wherein the combiner is implemented to combine, for each projection channel, the provisional single images of the respective projection channel calculated for the at least two images to be projected to the final single image for the respective projection channel such that the final single image of the respective projection channel is—at locations where at least one of the provisional single images, calculated for the at least two images to be projected for the respective projection channel, is non-zero, and at least another one of the provisional single images, calculated for the at least two images to be projected for the respective projection channel, is zero, darkened more with respect to a positive superposition of the provisional single images calculated for all of the at least two images to be projected for the respective projection channel than at locations where all of the provisional single images calculated for the at least two images to be projected for the respective projection channel are non-zero.

2. Single image generator according to claim 1, wherein the combiner is implemented to perform the combination by using a logic operation between the provisional single images of the respective projection channel calculated for the at least two images to be projected.

3. Single image generator according to claim 2, wherein the combiner is implemented such that the logic operation comprises a logic AND-linkage or a logic OR-linkage of the provisional single images of the respective projection channel.

4. Single image generator according to claim 1, wherein the single image calculator is implemented such that the provisional single images are binary.

5. Single image generator according to claim 1, wherein the image data represent the at least two images to be projected in a binary manner or the single image calculator is implemented to perform the calculation such that for each of the at least two images to be projected the provisional single images are binary, but are superposed at the respective projection distance to the respective image to be projected in a three- or higher-valued manner.

6. Single image generator according to claim 1, wherein the input is implemented to receive the image data in a format, according to which in the image data an image is comprised at different projection distances from which the at least two images to be projected result by centric extension in dependence on the respective projection distance, such that the final single images result in a projection of the binary image with an increased depth of focus.

7. Multi-aperture projection display comprising a single image generator according to claim 1.

8. Multi-aperture projection display comprising a plurality of laterally adjacent projection channels comprising one single image generator each for generating a respective single image and optics for mapping the respective single image which lies in an object plane of the optics into a projection direction of the multi-aperture projection display, wherein the single images of the projection channels are implemented such that the mappings of the single images of the projection channels are superposed at at least two different projection distances to one respective projected image each, wherein, for each projection channel, the single image generated by the respective single image generator differs from a positive superposition of back-projections of the projected images at the different projection distances via the optics of the respective projection channel into the object plane of the optics of the respective projection channels so that at locations where the back projection of at least one of the projected images at the different projection distances into the object plane of the optics of the respective projection channels is zero, and the back projection of at least another one of the projected images at the different projection distances into the object plane of the optics of the respective projection channels is non-zero, the single image generated by the respective single image generator is darkened relative to the positive superposition more than at locations where the back projection of all of the projected images at the different projection distances into the object plane of the optics of the respective projection channels is non-zero.

9. Multi-aperture projection display according to claim 8, wherein a maximum of a differential amount between the at least two different projection distances is greater than $$\frac{2DL^2\beta}{D^2 - L^2\beta^2},$$

wherein D is an expansion across which all optics of the projection channel extend, L is an average value of the different projection distances and $\beta=0.005$.

10. Multi-aperture projection display according to claim 8, wherein the single image generator is implemented such that, for each of the plurality of projection channels, the single image is binary.

11. Multi-aperture projection display according to claim 10, wherein the single image generator is implemented such that the projected images are binary at the different projection distances, and for each of the plurality of projection channels, the single image represents a logic AND- or OR-operation of back projections of the projected images at the different projection distances via the optics of the respective projection channels onto the object plane of the optics of the respective projection channel.

12. Multi-aperture projection display according to claim 8, wherein the single image generator is implemented such that the projected images can be converted into one another at the different projection distances by centric projection onto an intersection between an optical axis of the multi-aperture projection display and a plane where the entrance pupils of the optics of the multi-aperture projection display are arranged.

13. Multi-aperture projection display according to claim 8, wherein for each projection channel the respective single image generator comprises a series connection of backlighting and shadow mask or a front lighting and a reflective mask.

14. Multi-aperture projection display according to claim 7, wherein the projection channels are implemented such that the projected images to which the mappings of the single images of the projection channels are superposed at the at least two different projection distances are real images, or the projection channels are implemented such that the projected images to which the mappings of the single images of the projection channels are superposed at the at least two different projection distances are virtual images.

15. Method for single image generation for a multi-aperture projection display comprising a plurality of projection channels, comprising receiving image data representing at least two images to be projected at different projection distances;

calculating a provisional single image for each of the at least two images to be projected per projection channel; and combining, for each projection channel, the provisional single images of the respective projection channel calculated for the at least two images to be projected, to a final single image for the respective projection channel, wherein the combining comprising combining, for each projection channel, the provisional single images of the respective projection channel calculated for the at least two images to be projected to the final single image for the respective projection channel such that the final single image of the respective projection channel is—at locations where at least one of the provisional single images, calculated for the at least two images to be projected for the respective projection channel, is non-zero, and at least another one of the provisional single images, calculated for the at least two images to be projected for the respective projection channel, is zero, darkened more with respect to a positive superposition of the provisional single images calculated for all of the at least two images to be projected for the respective projection channel than at locations where all of the provisional single images calculated for the at least two images to be projected for the respective projection channel are non-zero.

16. Production method comprising a method for single image generation for a multi-aperture projection display comprising a plurality of projection channels, comprising receiving image data representing at least two images to be projected at different projection distances;

calculating a provisional single image for each of the at least two images to be projected per projection channel; and combining, for each projection channel, the provisional single images of the respective projection channel calculated for the at least two images to be projected, to a final single image for the respective projection channel, and wherein the combining comprising combining, for each projection channel, the provisional single images of the respective projection channel calculated for the at least two images to be projected to the final single image for the respective projection channel such that the final single image of the respective projection channel is—at locations where at least one of the provisional single images, calculated for the at least two images to be projected for the respective projection channel, is non-zero, and at least another one of the provisional single images, calculated for the at least two images to be projected for the respective projection channel, is zero, darkened more with respect to a positive superposition of the provisional single images calculated for all of the at least two images to be projected for the respective projection channel than at locations where all of the provisional single images calculated for the at least two images to be projected for the respective projection channel are non-zero, and a production of an array of optical masks such that the same correspond to the final single images generated by the method for single image generation.

17. Non-transitory computer-readable medium storing a computer program comprising a program code for performing the method according to claim 15 when the program runs on a computer.

18. Single image generator for a multi-aperture projection display with a plurality of projection channels, comprising an input that is implemented to receive image data representing at least two images to be projected at different projection distances;

a single image calculator that is implemented to calculate a provisional single image for each of the at least two images to be projected per projection channel of the multi-aperture projection display; and a combiner that is implemented to combine, for each projection channel, the provisional single images of the respective projection channel calculated for the at least two images to be projected to a final single image for the respective projection channel, wherein the single image generator further comprises a projection optics and a single image generator which lies in an object plane of the projection optics for each of the plurality of projection channels which are arranged laterally adjacent to each other, wherein the single image calculator is implemented to calculate the provisional single image for each of the at least two images to be projected per projection channel of the multi-aperture projection display such that, when outputting to the single image generator of each respective projection channel, the respective provisional single image computed for the respective image, the respective image superimposes at a respective projection distance, wherein the projection distances of the at least two images are different, and wherein the combiner is configured to output, for each projection channel, the respective final single image to the single image generator of the respective projection channel, wherein the combiner is implemented to combine, for each projection channel, the provisional single images of the respective projection channel calculated for the at least two images to be projected to the final single image for the respective projection channel such that the final single image of the respective projection channel differs from a positive superposition of the provisional single images calculated for the at least two images to be projected for the respective projection channel so that at locations where at least one of the provisional single images calculated for the at least two images to be projected for the respective projection channel, is non-zero, and at least another one of the provisional single images, calculated for the at least two images to be projected for the respective projection channel, is zero, the final single image of the respective projection channel is darkened relative to the positive superposition of the provisional single images calculated for all of the at least two images to be projected for the respective projection channel more than at locations where the provisional single images, calculated for all of the at least two images to be projected for the respective projection channel, are non-zero.

19. Single image generator for a multi-aperture projection display with a plurality of projection channels, comprising an input that is implemented to receive image data representing at least two images to be projected at different projection distances;

a single image calculator that is implemented to calculate a provisional single image for each of the at least two images to be projected per projection channel of the multi-aperture projection display; and a combiner that is implemented to combine, for each projection channel, the provisional single images of the respective projection channel calculated for the at least two images to be projected to a final single image for the respective projection channel, wherein the single image generator further comprises a projection optics and a single image generator which lies in an object plane of the projection optics for each of the plurality of projection channels which are arranged laterally adjacent to each other, wherein the single image calculator is implemented to calculate the provisional single image for each of the at least two images to be projected per projection channel of the multi-aperture projection display such that, when outputting to the single image generator of each respective projection channel, the respective provisional single image computed for the respective image, the respective image superimposes at a respective projection distance, wherein the projection distances of the at least two images are different, and wherein the combiner is configured to output, for each projection channel, the respective final single image to the single image generator of the respective projection channel, wherein the combiner is implemented to combine, for each projection channel, the provisional single images calculated for the at least two images to be projected for the respective projection channel to the final single image for the respective projection channel by computing, pixel-wise, a mathematical combination of collocated pixels of the provisional single images calculated for the at least two images to be projected for the respective projection channel, and wherein the combiner is implemented to combine, for each projection channel, the provisional single images of the respective projection channel calculated for the at least two images to be projected to the final single image for the respective projection channel such that the final single image of the respective projection channel differs from a positive superposition of the provisional single images of the respective projection channel calculated for the at least two images to be projected so that at locations where at least one of the provisional single images calculated for the at least two images to be projected for the respective projection channel, is non-zero, and at least another one of the provisional single images, calculated for the at least two images to be projected for the respective projection channel, is zero, the final single image of the respective projection channel is darkened relative to the positive superposition of the provisional single images calculated for all of the at least two images to be projected for the respective projection channel more than at locations where the provisional single images, calculated for all of the at least two images to be projected for the respective projection channel, are non-zero.

* * * * *